(12) United States Patent
Aramoto et al.

(10) Patent No.: US 10,548,044 B2
(45) Date of Patent: Jan. 28, 2020

(54) MOBILE COMMUNICATION SYSTEM, QOS CONTROL STATION AND MOBILE STATION

(71) Applicant: SHARP KABUSHIKI KAISHA, Osaka-shi, Osaka (JP)

(72) Inventors: Masafumi Aramoto, Osaka (JP); Hirokazu Naoe, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 191 days.

(21) Appl. No.: 14/263,734

(22) Filed: Apr. 28, 2014

(65) Prior Publication Data

US 2014/0233388 A1 Aug. 21, 2014

Related U.S. Application Data

(63) Continuation of application No. 13/143,302, filed as application No. PCT/JP2009/071653 on Dec. 25, 2009, now abandoned.

(30) Foreign Application Priority Data

Jan. 6, 2009 (JP) .................................. 2009-001124

(51) Int. Cl.
*H04W 28/02* (2009.01)
*H04W 36/28* (2009.01)
*H04W 36/14* (2009.01)

(52) U.S. Cl.
CPC ... *H04W 28/0252* (2013.01); *H04W 28/0268* (2013.01); *H04W 36/28* (2013.01); *H04W 36/14* (2013.01)

(58) Field of Classification Search
CPC ................................................ H04W 28/0252
See application file for complete search history.

(56) References Cited

U.S. PATENT DOCUMENTS

2003/0224826 A1  12/2003  Sakata et al.
2004/0151136 A1   8/2004  Gage
(Continued)

FOREIGN PATENT DOCUMENTS

JP    2003-348661 A    12/2003
JP    2004-363730 A    12/2004
(Continued)

OTHER PUBLICATIONS

3GPP TR 23.xxx V0.1.0 (Nov. 2008) "Multi access PDN connectivity and IP flow mobility" (Release 9).
(Continued)

*Primary Examiner* — Jason E Mattis
(74) *Attorney, Agent, or Firm* — Birch, Stewart, Kolasch & Birch, LLP

(57) ABSTRACT

A first access network in which a bearer transfer path that guarantees a predetermined QoS has been established and a second access network in which a transfer path which is different from that in the first access network has been established are provided, and PCRF 60 transmits to a mobile station an uplink traffic switching request including information of a flow of which the access system type is switched, out of flows in which a UE 10 performs communication, and information of an access system type to be a switching destination of the flow, and the UE 10, upon receiving the uplink traffic switching request, switches a transfer path of the flow included in the uplink traffic switching request to that of the access system type. This makes it possible to provide a mobile communication system or the like in which a transmission path of a flow established by a mobile station capable of being simultaneously connected to a plurality of radio access networks is able to be switched without making alterations to all the
(Continued)

radio access networks, with initiative taken by a control station installed in a core network.

10 Claims, 22 Drawing Sheets

(56) References Cited

U.S. PATENT DOCUMENTS

| | | | |
|---|---|---|---|
| 2005/0003819 A1* | 1/2005 | Wu | H04W 36/0066 455/436 |
| 2005/0249121 A1* | 11/2005 | Matsunaga | 370/238 |
| 2005/0272428 A1 | 12/2005 | Tanabe et al. | |
| 2006/0129630 A1 | 6/2006 | Catalina-Gallego et al. | |
| 2006/0193295 A1 | 8/2006 | White et al. | |
| 2007/0015540 A1 | 1/2007 | Sakata et al. | |
| 2007/0060169 A1 | 3/2007 | Johansson et al. | |
| 2008/0013545 A1 | 1/2008 | Ono et al. | |
| 2008/0256260 A1 | 10/2008 | Magnusson et al. | |
| 2009/0156215 A1* | 6/2009 | Pitkamaki | H04W 36/14 455/437 |
| 2009/0253434 A1 | 10/2009 | Hayashi et al. | |
| 2009/0305701 A1 | 12/2009 | Giaretta et al. | |
| 2010/0020767 A1 | 1/2010 | Kumai et al. | |
| 2010/0202323 A1 | 8/2010 | Nashida et al. | |

FOREIGN PATENT DOCUMENTS

| | | |
|---|---|---|
| JP | 2005-57551 A | 3/2005 |
| JP | 2006-20270 A | 1/2006 |
| JP | 2006-518965 A | 8/2006 |
| JP | 2008-22312 A | 1/2008 |
| JP | 2009-4851 A | 1/2009 |
| WO | WO 2008/072687 A1 | 6/2008 |
| WO | WO 2008/114449 A1 | 9/2008 |
| WO | WO 2008/156019 A1 | 12/2008 |

OTHER PUBLICATIONS

3GPP TS23.402 V8.4.1 (Jan. 2009) "Architecture enhancements for non-3GPPaccesses" (Release 8).
International Search Report dated Apr. 6, 2010 for PCT/JP2009/071653.
Office Action dated May 9, 2013 for U.S. Appl. No. 13/143,302.
Office Action dated Nov. 27, 2013 for U.S. Appl. No. 13/143,302.
Soliman, et al., IETF, Internet draft, "Flow Bindings in Mobile IPv6 and Nemo Basic Support," May 16, 2008.
NEC, "IP Flow Mobility for Individual flows ofa single PDN Connection", 3GPP TSG SA WG2 Meeting #69, Nov. 17-21, 2008, Miami, Florida.
3GPP, "3rd Generation Partnership Project; Technical Specification Group Services and Systems Aspects; Network Architecture," (Release 8), 3GPP TS 23.002 V8.3.0 Sep. 2008, pp. 1-85.

* cited by examiner

FIG. 6

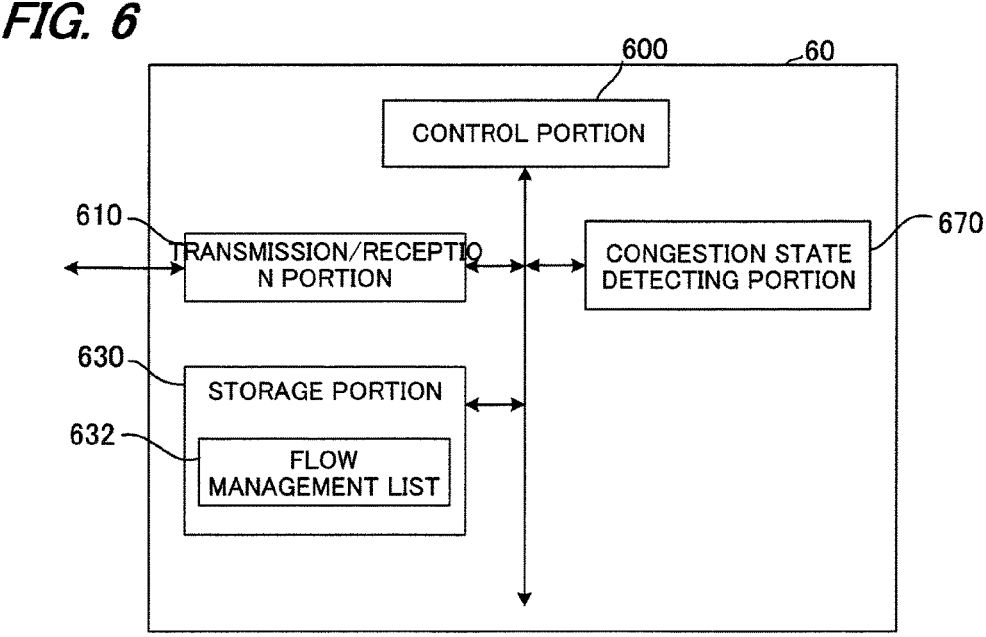

FIG. 7

| FLOW | QUALITY OF SERVICE | ACCESS SYSTEM TYPE | PRIORITY ORDER |
|---|---|---|---|
| FLOW 1 (TFT1) | GBR 128kb/s | RADIO ACCESS NETWORK A | 1 |
| | | RADIO ACCESS NETWORK B | 2 |
| FLOW 2 (TFT2) | NON-GBR | RADIO ACCESS NETWORK A | 1 |
| | | RADIO ACCESS NETWORK B | 2 |

| UE ADDRESS | ACCESS SYSTEM TYPE | TRANSMISSION PATH |
|---|---|---|
| HoA | RADIO ACCESS NETWORK A | PMIP TUNNEL 1 |

(b)

| UE ADDRESS | ACCESS SYSTEM TYPE | TRANSMISSION PATH |
|---|---|---|
| HoA | RADIO ACCESS NETWORK A | PMIP TUNNEL 1 |
| | RADIO ACCESS NETWORK B | PMIP TUNNEL 2 |

| UE ADDRESS | FLOW | ACCESS SYSTEM TYPE |
|---|---|---|
| HoA | DEFAULT (TFT 0) | RADIO ACCESS NETWORK A |

(b)

| UE ADDRESS | FLOW | ACCESS SYSTEM TYPE |
|---|---|---|
| HoA | FLOW 1 (TFT 1) | RADIO ACCESS NETWORK A |
| | FLOW 2 (TFT 2) | RADIO ACCESS NETWORK A |
| | DEFAULT (TFT 0) | RADIO ACCESS NETWORK A |

(c)

| UE ADDRESS | FLOW | ACCESS SYSTEM TYPE |
|---|---|---|
| HoA | FLOW 1 (TFT 1) | RADIO ACCESS NETWORK A |
| | FLOW 2 (TFT 2) | RADIO ACCESS NETWORK B |
| | DEFAULT (TFT 0) | RADIO ACCESS NETWORK A |

| UE IDENTIFIER | FLOW | ACCESS SYSTEM TYPE | QUALITY OF SERVICE |
|---|---|---|---|
| UE1 | DEFAULT (TFT 0) | RADIO ACCESS NETWORK A | NON-GBR |

(b)

| UE IDENTIFIER | FLOW | ACCESS SYSTEM TYPE | QUALITY OF SERVICE |
|---|---|---|---|
| UE1 | FLOW 1 (TFT 1) | RADIO ACCESS NETWORK A | GBR, 128kb/s |
| | FLOW 2 (TFT 2) | RADIO ACCESS NETWORK A | NON-GBR |
| | DEFAULT (TFT 0) | RADIO ACCESS NETWORK A | NON-GBR |

(c)

| UE IDENTIFIER | FLOW | ACCESS SYSTEM TYPE | QUALITY OF SERVICE |
|---|---|---|---|
| UE1 | FLOW 1 (TFT 1) | RADIO ACCESS NETWORK A | GBR, 128kb/s |
| | FLOW 2 (TFT 2) | RADIO ACCESS NETWORK A | NON-GBR |
| | DEFAULT (TFT 0) | RADIO ACCESS NETWORK A | NON-GBR |
| | - (NO FLOW ALLOCATION) | RADIO ACCESS NETWORK B | - |

(d)

| UE IDENTIFIER | FLOW | ACCESS SYSTEM TYPE | QUALITY OF SERVICE |
|---|---|---|---|
| UE1 | FLOW 1 (TFT 1) | RADIO ACCESS NETWORK A | GBR, 128kb/s |
| | FLOW 2 (TFT 2) | RADIO ACCESS NETWORK B | NON-GBR |
| | DEFAULT (TFT 0) | RADIO ACCESS NETWORK A | NON-GBR |

MOBILE COMMUNICATION SYSTEM, QOS CONTROL STATION AND MOBILE STATION

This application is a Continuation of co-pending application Ser. No. 13/143,302 filed on Sep. 13, 2011, and for which priority is claimed under 35 U.S.C. § 120, application Ser. No. 13/143,302 is the national phase of PCT International Application No. PCT/JP2009/71653 filed on Dec. 25, 2009 under 35 U.S.C. § 371, which claims the benefit of priority of JP2009-1124 filed Jan. 6, 2009. The entire contents of each of the above-identified applications are hereby incorporated by reference.

TECHNICAL FIELD

The present invention relates to a mobile communication system or the like provided with a first access network in which a bearer transfer path that guarantees a predetermined QoS has been established and a second access network in which a transfer path which is different from that in the first access network has been established, including a control station, a mobile station in which a path is set to perform a plurality of flows of communication with the control station via a transfer path designated by an access system type, and a QoS control station which controls the QoS.

BACKGROUND ART

In the 3GPP, a standardization organization of communication standards, EPS is specified as a next generation mobile communication system (for example, see non-patent document 1). The EPS is composed of EPC (Evolved Packet Core) serving as a core network and a plurality of radio access networks which are connected to the EPC. Further, specific examples of the radio access networks are assumed to include not only radio access networks specified by the 3GPP (hereinafter referred to as a "3GPP access network") such as E-UTRAN (Evolved-Universal Terrestrial Radio Access Network) and UTRAN (Universal Terrestrial Radio Access Network), but also radio access networks which are not specified by the 3GPP (hereinafter referred to as a "Non-3GPP access network") such as WiMAX and wireless LAN (for example, IEEE802.11, etc.).

Additionally, a UE (User Equipment: mobile station) capable of being connected to these plurality of radio access networks is able to perform handover between radio access networks while maintaining communication session with the other communication end in accordance with a procedure specified in non-patent document 2, for example.

Further, non-patent document 3 discloses a new usage scenario that an individual radio access network has different characteristics in the aspects of maximum throughput, a cell radius or the like based on a radio access technology to be used, therefore, in view of the different characteristics, in an environment where a plurality of radio access networks are able to be used simultaneously, a radio access network for transmitting, for each application or the other communication end, communication data thereof (hereinafter referred to as a flow) is switched.

Specifically, in a flow unit, a quality of service to be required (real time communication, non-real time communication, a required band or the like) and a priority order of a radio access network to be used are set (hereinafter referred to as a policy), and when a higher priority radio access network has become available, a radio access network to be used is changed in a flow unit.

For example, a case or the like is shown in which, when a UE having a function of connecting to the E-UTRAN and the wireless LAN establishes two flows of VoIP (Voice over Internet Protocol) traffic and file download in an E-UTRAN area, and then moves into a wireless LAN area while being in the E-UTRAN area, in accordance with a policy which has been set, as to the VoIP traffic for which real time characteristics are required in terms of delay, fluctuation or the like, communication is continued via the E-UTRAN, and as to the file download for which real time characteristics are not required, switching is performed to the wireless LAN with which higher throughput is expected.

PRIOR ART DOCUMENTS

Non-Patent Document

Non-Patent Document 1: 3GPP TS23.401 General Packet Radio Service (GPRS) enhancements for Evolved Universal Terrestrial Radio Access Network (E-UTRAN) access
Non-Patent Document 2: 3GPP TS23.402 Architecture enhancements for Non-3GPP accesses
Non-Patent Document 3: 3GPP contribution S2-088124 Multi access PDN connectivity and IP flow mobility

SUMMARY OF THE INVENTION

Problems to be Solved by the Invention

In this handover in a flow unit, since the UE is able to use a radio access network separately for each flow, there is an advantage that it becomes unnecessary to accommodate all the traffic only by a single radio access network, enabling to process more user traffic effectively from the viewpoint of a mobile communication system provider.

For example, in a radio access technology of a cellular system represented by an E-UTRA, although there is an advantage that a cell radius is larger than that of a wireless LAN, an allocated frequency band needs to be shared by a number of users and there is limitation with respect to a maximum communication rate. Whereas the wireless LAN has a small coverage area, but because thereof, it is possible to occupy the frequency band with smaller number of users, and a user is able to freely install a base station of the wireless LAN in a house, an office or the like.

Accordingly, when the UE is able to be simultaneously connected to both radio access networks of the E-UTRAN and the wireless LAN, among a plurality of flows established via the E-UTRAN according to a policy set in the UE, by switching a specified flow to be via the wireless LAN on condition that a quality of service requested by the flow is maintained, it is possible to allocate a radio resource of the released E-UTRAN to the other UE which is connectable only to the E-UTRAN on a priority basis. Additionally, when traffic on the E-UTRAN becomes congested, it may be considered that a part of flows is transferred to be via the wireless LAN, or on the contrary, when traffic on the wireless LAN becomes congested, a part of flows is transferred to be via the E-UTRAN.

However, non-patent document 3 does not show a technical solution for realizing a handover in a flow unit in EPS as described above. Additionally, specific means for realizing that is required to be realized by minimum function enhancement with respect to EPS provided in non-patent document 1 and non-patent document 2 in view of smooth introduction to a conventional system.

Further, in such the handover in the flow unit, it is necessary to judge a most appropriate allocation method after understanding what resource distribution and a congestion state in an entire system are like, and means for realizing that is initiated by an apparatus in a network at the discretion of a mobile communication system provider capable of intensively managing the above-described information, and a method is required to be able to accommodate more traffic in an entire mobile communication system by attempting flow distribution between a plurality of access networks while keeping a quality of service desired by a user.

Additionally, the EPC is configured so as to be able to accommodate a plurality of radio access systems, and it is considered to accommodate not only a presently assumed radio access network such as the E-UTRAN and the wireless LAN, but also even a radio access network composed of a radio access technology which will be newly developed in the future. Accordingly, a handover procedure in a flow unit initiated by a network as a problem is desirably an easily applicable method, instead of such a method that requires individual alteration to a new radio access network.

The present invention has been made in view of such a circumstance, and an object thereof is to provide a mobile communication system or the like in which a transmission path of a flow established by a mobile station capable of being simultaneously connected to a plurality of radio access networks is able to be switched without making alterations to all the radio access networks, initiated by a control station installed in a core network.

Means for Solving the Problems

In view of the above-described problem, a mobile communication system of the present invention is provided with a first access network in which a bearer transfer path that guarantees a predetermined QoS has been established and a second access network in which a transfer path which is different from that in the first access network has been established, including a control station; a mobile station in which a path is set to perform a plurality of flows of communication with the control station via a transfer path designated by an access system type; and a QoS control station which controls a QoS, wherein the QoS control station has an uplink traffic switching request transmitting means for transmitting an uplink traffic switching request including information of a flow of which the access system type is switched, out of flows in which the mobile station performs communication, and information of an access system type to be a switching destination of the flow, and the mobile station has an uplink transfer path switching means for switching a transfer path of the flow included in the uplink traffic switching request to that of the access system type upon receiving the uplink traffic switching request.

Additionally, a mobile communication system of the present invention is characterized in that the mobile station further includes a notifying means for notifying a control station that the transfer path of the flow is switched to the transfer path of the access system type by the uplink transfer path switching means, and the control station further includes a downlink transfer path switching means for switching a transfer path from the control station to the mobile station to the transfer path of the access system type when the control station is notified by the notifying means that the mobile station has switched the transfer path of the flow to the transfer path of the access system type.

A QoS control station of the present invention constitutes a mobile communication system provided with a first access network in which a bearer transfer path that guarantees a predetermined QoS has been established and a second access network in which a transfer path which is different from that in the first access network has been established, and including a control station, a mobile station in which a path is set to perform a plurality of flows of communication with the control station via a transfer path designated by an access system type, and a QoS control station which controls a QoS, characterized by including an uplink traffic switching request transmitting means for transmitting to the mobile station an uplink traffic switching request including information of a flow of which the access system type is switched, out of flows in which the mobile station performs communication, and information of an access system type to be a switching destination of the flow.

A mobile station of the present invention constitutes a mobile communication system provided with a first access network in which a bearer transfer path that guarantees a predetermined QoS has been established and a second access network in which a transfer path which is different from that in the first network has been established, and including a control station, a mobile station in which a path is set to perform a plurality of flows of communication with the control station via a transfer path designated by an access system type, and a QoS control station which controls a QoS, characterized by including an uplink traffic switching request receiving means for receiving, from the QoS control station, an uplink traffic switching request including information of a flow of which the access system type is switched and information of an access system type to be a switching destination of the flow, and an uplink transfer path switching means for switching a transfer path of the flow included in the uplink traffic switching request to that of the access system type when receiving the uplink traffic switching request.

Advantages of the Invention

According to the invention, it becomes possible to change a transmission path of a flow established by a mobile station, with initiative taken by a network, and to perform traffic distribution between a plurality of radio access networks while ensuring a quality of service desired by a mobile station.

Additionally, the above-described procedure of changing the transmission path of the flow is able to be performed via one radio access network among a plurality of radio access networks, thus making it possible to minimize alteration to an individual radio access system

BRIEF DESCRIPTION OF THE DRAWINGS

FIG. 6 is a configuration diagram of a PCRF in the first embodiment.

FIG. 7 is a diagram showing an example of a data configuration of policy information in the first embodiment.

FIG. 8 is a diagram showing an example of a data configuration of binding information in the first embodiment.

FIG. 9 is a diagram showing an example of data configuration of a flow allocation list in the first embodiment.

FIG. 10 is a diagram showing an example of a data configuration of a flow management list in the first embodiment.

MODES FOR CARRYING OUT THE INVENTION

Description will hereinafter be given for a best mode for carrying out the present invention with reference to drawings. Meanwhile, in the present embodiment, an embodiment of a mobile communication system when the present invention is applied thereto will be described in detail as an example with use of the drawings.

1. First Embodiment

First, description will be given for the first embodiment to which the present invention is applied with reference to the drawings.

[1.1 Outline of Mobile Communication System]

Figure 1:
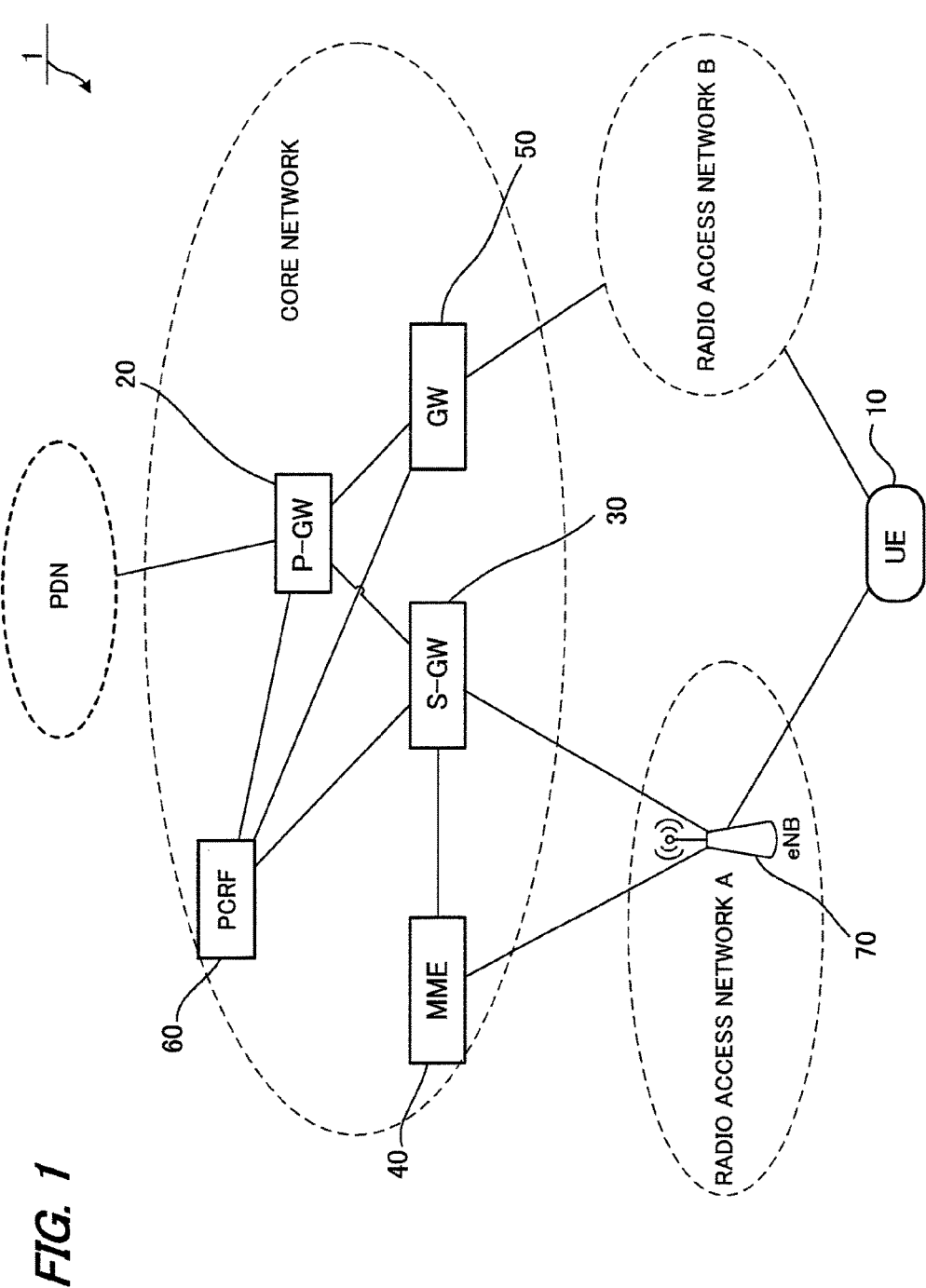
FIG. 1 is a configuration diagram of a mobile communication system in a first embodiment.

FIG. 1 is a diagram for describing an outline of a mobile communication system 1 in the present embodiment. As shown therein, in the mobile communication system 1, a radio access network A and a radio access network B are connected to a core network. The radio access network A and the radio access network B are different radio access networks, and in the present embodiment, description will be given with an E-UTRAN as the radio access network A and with a Non-3GPP access network using a wireless LAN as the radio access network B. Additionally, a UE 10 as a mobile station is connected to the radio access network A and the radio access network B.

Meanwhile, kinds of these radio access networks are not limited thereto, and may certainly be other access networks such as WiMAX and a radio access network specified by 3GPP2.

In the core network, a P-GW 20, an S-GW 30, an MME 40, a GW 50, and a PCRF 60 are arranged.

The P-GW 20 is connected to foreign PDNs (Packet Data Network: packet communication network) such as an internet and an IMS network, functions as a gateway (control station) connecting the core network and these PDNs and sorts a flow addressed to the UE 10 to each of radio access networks.

The S-GW 30 is connected to an eNB 70 to which the UE 10 is connected, functions as a local mobility anchor of the radio access network A and transfers a packet between the P-GW 20 and the eNB 70. Meanwhile, there is also a case where the P-GW 20 and the S-GW 30 are composed of the same nodes physically.

The MME 40 (Mobility Management Entity) is an entity which performs signaling to initiate a procedure of establishing an EPS bearer of the UE 10. An EPS bearer refers to a logical path for transferring a user IP packet which is established between the UE 10 and the S-GW 30. The UE 10 is able to establish a plurality of EPS bearers and allocate a different quality of service class for each EPS bearer. Additionally, a flow established by the UE 10 is linked to the EPS bearer to be transmitted/received via the radio access network A.

The PCRF 60 (Policy and Charging Rules Function) is an apparatus which performs management of a quality of service level for each flow established by the UE 10 as a QoS control station and charging rules and is connected to the S-GW 30 and the P-GW 20.

The radio access network A is provided with at least one base station eNB 70 and connected to the core network via the S-GW 30.

Additionally, the radio access network B is connected to the core network via the GW 50 serving as a gateway apparatus. Moreover, when there is a trust relationship between the core network and the radio access network B (specifically, authentication function of the UE 10 provided in the core network is allowed to be used), the GW 50 is also connected to the PCRF 60, and the GW 50 itself is installed in the radio access network B.

The UE 10 is connected to the radio access network A via the eNB 70 as well as being able to be connected to the radio access network B simultaneously, and connected to the core network via the respective radio access networks.

[1.2 Apparatus Configuration]

Next, brief description will be given for each apparatus configuration with use of the drawings. Meanwhile, since the MME 40 and the eNB 70 are configured similarly to the conventional apparatuses in a mobile communication system using the EPS, detailed description thereof will be omitted.

[1.2.1 Configuration of UE]

Figure 2:
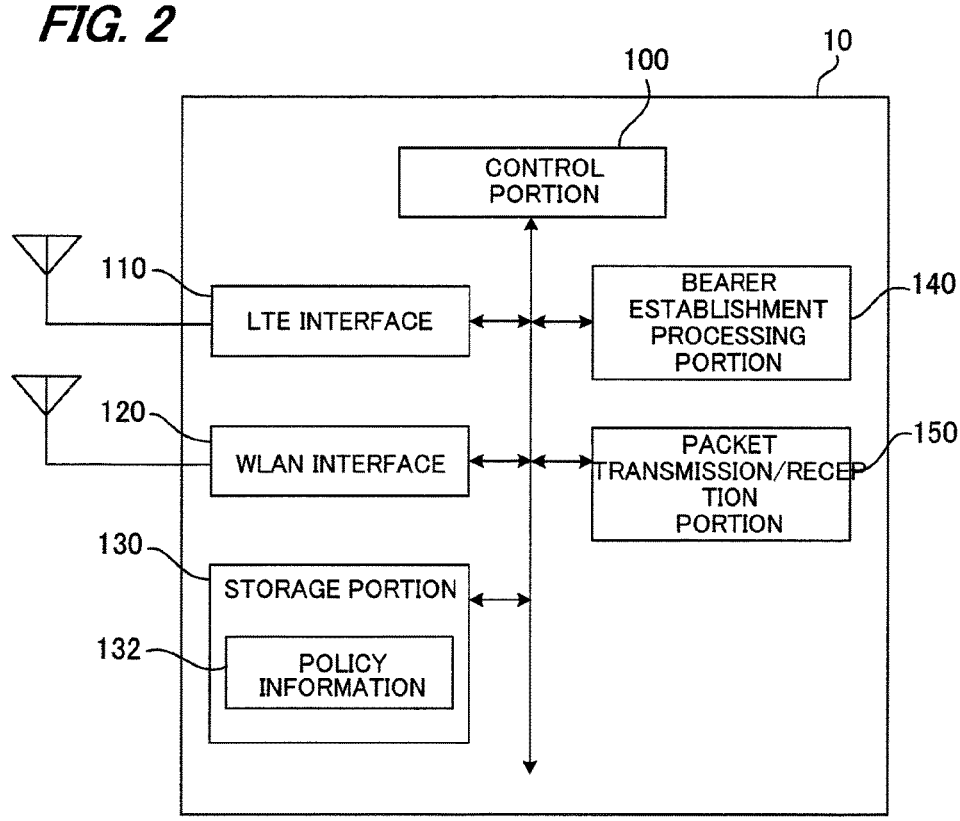
FIG. 2 is a configuration diagram of a UE in the first embodiment.

FIG. 2 shows a configuration of the UE 10 serving as a mobile station. A specific example of the UE 10 is assumed to include a mobile terminal which is simultaneously connected to the core network via a plurality of access networks and a terminal such as a PDA. In the UE 10, an LTE interface 110, a WLAN interface 120, a storage portion 130, a bearer establishment processing portion 140, and a packet transmission/reception portion 150 are connected to a control portion 100 via buses.

The control portion 100 is a function portion for controlling the UE 10. The control portion 100 realizes processing by reading and executing various programs stored in the storage portion 130.

The LTE interface 110 and the WLAN interface 120 are function portions for the UE 10 to be connected to each radio access network. The LTE interface 110 is an interface to be connected to the radio access network A and the WLAN interface 120 is an interface to be connected to the radio access network B. Additionally, external antennas are connected to the LTE interface 110 and the WLAN interface 120 respectively.

The storage portion 130 is a function portion for storing a program, data or the like needed for various operations of the UE 10. Further, policy information 132 is stored in the storage portion 130.

The policy information 132 is information in which policy information in a flow unit is stored, and as to which radio access network is used on a priority basis among available radio access networks, a priority order and a quality of service to be required are determined in a flow unit.

Meanwhile, each flow is defined by aggregation of filter information for identifying a flow called a TFT (Traffic Flow Template). A destination address or a port number are able to be designated for each filter information, and as a result, a traffic flow of a specified application or a flow with a specified communication counterpart are able to be identified by the TFT. Here, it is assumed that a flow 1 is VoIP traffic and a guaranteed bit rate (GBR; Guaranteed Bit Rate) and 128 kbps are required as a quality of service class. Additionally, it is assumed that a flow 2 is file download traffic and non-GBR is required as a quality of service class.

Here, an example of a data configuration of the policy information 132 is shown in FIG. 7. As shown in FIG. 7, in the policy information 132, in association with a flow (for example, "flow 1 (TFT 1)", a quality of service (for example, "GBR 128 kb/s"), an access type network (for example, "radio access network A"), and a priority order (for example, "1") are stored.

The bearer establishment processing portion 140 is a function portion which executes processing for establishing an EPS bearer serving as a communication path with the S-GW 30 via the radio access network A.

The packet transmission/reception portion 150 is a function portion which transmits/receives specific data (packet). Data received from an upper layer is disassembled to be transmitted as a packet. Additionally, a function of passing the received packet to the upper layer is realized.

[1.2.2 Configuration of P-GW]

Figure 3:
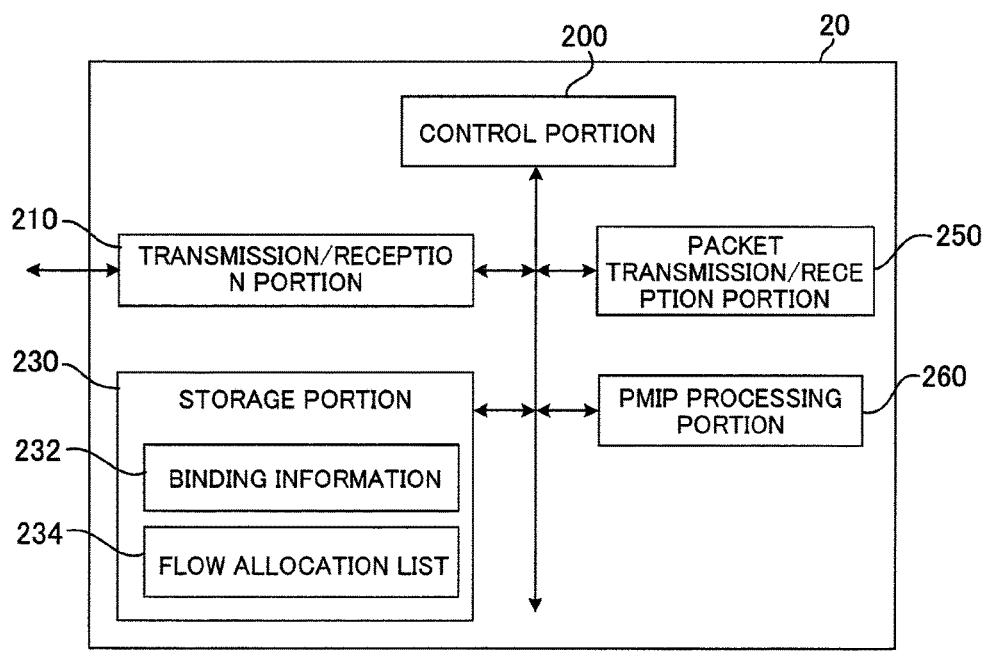
FIG. 3 is a configuration diagram of a P-GW in the first embodiment.

Next, description will be given for a configuration of the P-GW 20 in the present embodiment based on FIG. 3. In the P-GW 20, a transmission/reception portion 210, a storage portion 230, a packet transmission/reception portion 250, and a PMIP processing portion 260 are connected to a control portion 200 via buses.

The control portion 200 is a function portion for controlling the P-GW 20. The control portion 200 realizes processing by reading and executing various programs stored in the storage portion 230.

The transmission/reception portion 210 is a function portion which is wire-connected to a router or a switch and performs transmission/reception of a packet. For example, transmission/reception is performed by Ethernet (registered trademark) generally used as a connection method of a network, or the like.

The storage portion 230 is a function which stores a program, data or the like needed for various operations of the P-GW 20. Further, the storage portion 230 stores the binding information 232 and the flow allocation list 234.

The binding information 232 is a database which is used, when the P-GW 20 receives communication data addressed to the UE 10, for determining a transmission path to transfer the communication data to the UE 10. Here, an example of the binding information 232 is shown in FIG. 8.

As shown in FIG. 8, an IP address of the UE 10 (hereinafter referred to as a HoA; Home Address), an access system type of the radio access network to which the UE 10 is connected (for example, "radio access network A"), and a transmission path to the radio access network (for example, "PMIP tunnel 1") are recorded in association with each other.

Here, the access system type is an identifier to identify an access network to which the UE 10 is connected, and also identifies a radio access technology such as a 3GPP_U-TRAN, a 3GPP_E-UTRAN, a WiMAX, a WLAN, 3GPP2_CDMA2000-1X, for example.

As shown in FIG. 9, the flow allocation list 234 manages the HoA (the UE 10 address), an established flow (for example, "default (TFT 0)"), an access system type which identifies an access network which transmits the flow (for example, "radio access network A") for each UE 10. This flow allocation list 234 is used, when the P-GW 20 receives a flow addressed to the UE 10, for determining an access network to transfer the flow to the UE 10.

The packet transmission/reception portion 250 is a function portion which transmits/receives specific data (packet). Data received from an upper layer is disassembled to be transmitted as a packet. Additionally, a function of passing a received packet to the upper layer is realized.

The PMIP processing portion 260 is a function portion for establishing a transfer path (called a PMIP tunnel) which is used between the P-GW 20 and the S-GW 30 as well as between the P-GW 20 and the GW 50 in order to be connected with the UE 10 via the radio access network A and the radio access network B.

[1.2.3 Configuration of S-GW]

Figure 4:
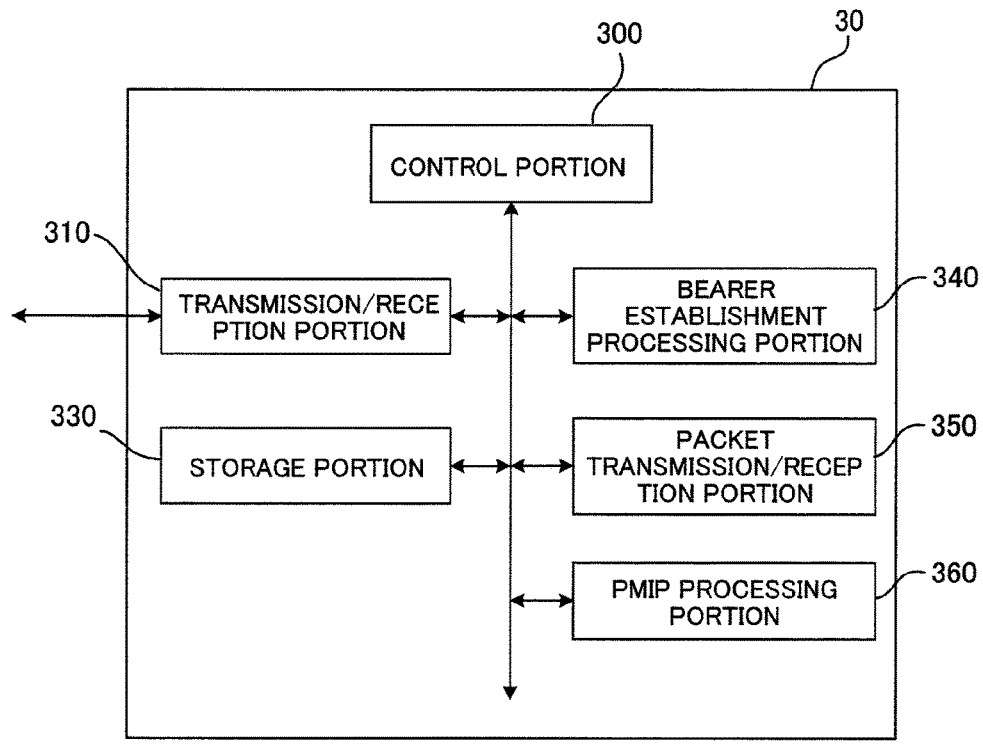
FIG. 4 is a configuration diagram of an S-GW in the first embodiment.

Next description will be given for a configuration of the S-GW 30 in the present embodiment based on FIG. 4. FIG.

4 is a diagram showing a configuration of the S-GW 30 and a transmission/reception portion 310, a storage portion 330, a bearer establishment processing portion 340, a packet transmission/reception portion 350, and a PMIP processing portion 360 are connected to a control portion 300 via buses.

The control portion 300 is a function portion for controlling the S-GW 30. The control portion 300 realizes processing by reading and executing various programs stored in the storage portion 330.

The transmission/reception portion 310 is a function portion which is wire-connected to a router or a switch and performs transmission/reception of a packet. For example, transmission/reception is performed by the Ethernet (registered trademark) generally used as a connection method of a network, or the like.

The storage portion 330 is a function portion which stores a program, data or the like needed for various operations of the S-GW 30.

The bearer establishment processing portion 340 is a function portion which executes processing for establishing an EPS bearer serving as a communication path to the UE 10 via the radio access network A.

The packet transmission/reception portion 350 is a function portion which transmits/receives specific data (packet). Data received from an upper layer is disassembled to be transmitted as a packet. Additionally, a function of passing the received packet to the upper layer is realized.

The PMIP processing portion 360 is a function portion for establishing a PMIP tunnel which is used between the P-GW 20 and the S-GW 30 so that the UE 10 is connected to the P-GW 20 via the radio access network A.

[1.2.4 Configuration of GW 50]

Figure 5:
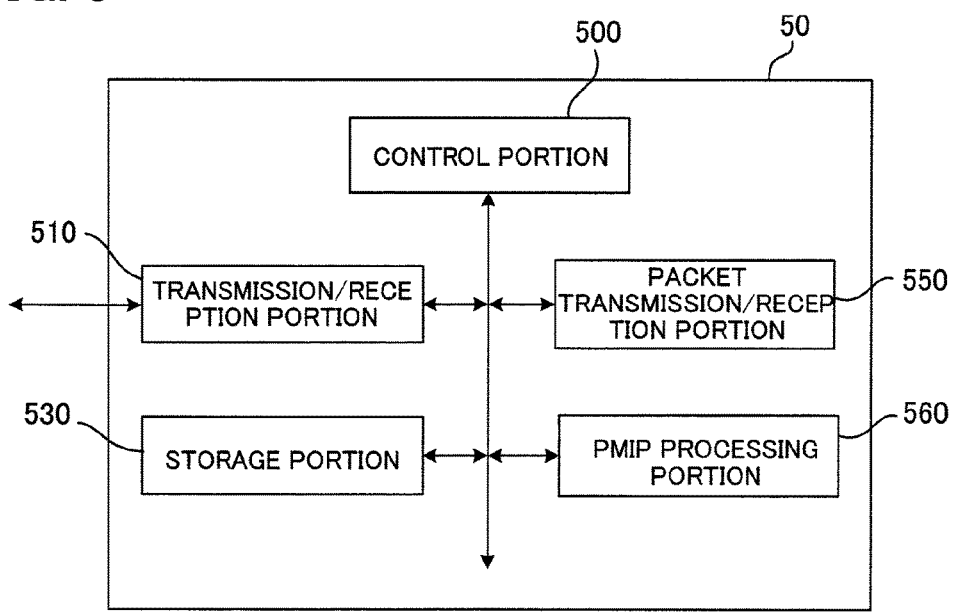
FIG. 5 is a configuration diagram of a GW in the first embodiment.

Next, description will be given for a configuration of the GW 50 in the present embodiment based on FIG. 5. FIG. 5 is a diagram showing the configuration of the GW 50 and a transmission/reception portion 510, a storage portion 530, a packet transmission/reception portion 550, and a PMIP processing portion 560 are connected to a control portion 500 via buses.

The control portion 500 is a function portion for controlling the GW 50. The control portion 500 realizes processing by reading and executing various programs stored in the storage portion 530.

The transmission/reception portion 510 is a function portion which is wire-connected to a router or a switch and performs transmission/reception of a packet. For example, transmission/reception is performed by the Ethernet (registered trademark) generally used as a connection method of a network, or the like.

The storage portion 530 is a function portion which stores a program, data or the like needed for various operations of the GW 50.

The packet transmission/reception portion 550 is a function portion which transmits/receives specific data (packet). Data received from an upper layer is disassembled to be transmitted as a packet. Additionally, a function of passing the received packet to the upper layer is realized.

The PMIP processing portion 560 is a function portion for establishing a PMIP tunnel which is used between the P-GW 20 and the GW 50 so that the UE 10 is connected to the P-GW 20 via the radio access network B.

[1.2.5 Configuration of PCRF]

Next, description will be given for a configuration of the PCRF 60 in the present embodiment based on FIG. 6. FIG. 6 is a diagram showing a configuration of the PCRF 60 and a transmission/reception portion 610, a storage portion 630, and a congestion state detecting portion 670 are connected to a control portion 600 via buses.

The control portion 600 is a function portion for controlling the PCRF 60. The control portion 600 realizes processing by reading and executing various programs stored in the storage portion 630.

The transmission/reception portion 610 is a function portion which is wire-connected to a router or a switch and performs transmission/reception of a packet. For example, transmission/reception is performed by the Ethernet (registered trademark) generally used as a connection method of a network, or the like.

The storage portion 630 is a function portion which stores a program, data or the like needed for various operations of the PCRF 60. Further, the storage portion 630 stores a flow management list 632.

The flow management list 632 is a database which records, for each UE 10, an established flow, an access system type of an access network to which the flow is allocated, and a quality of service which is requested by the flow in association with each other.

Description will be given for an example of a data configuration of the flow management list 632 with use of FIG. 10. As shown in the figure, a flow (for example, "default (TFT 0)"), an access system type (for example, the "radio access network A"), and a quality of service (for example, "non-GBR") are stored in association with a UE identifier (for example, a "UE 1")

[1.3 Description of Processing]

Figure 11:
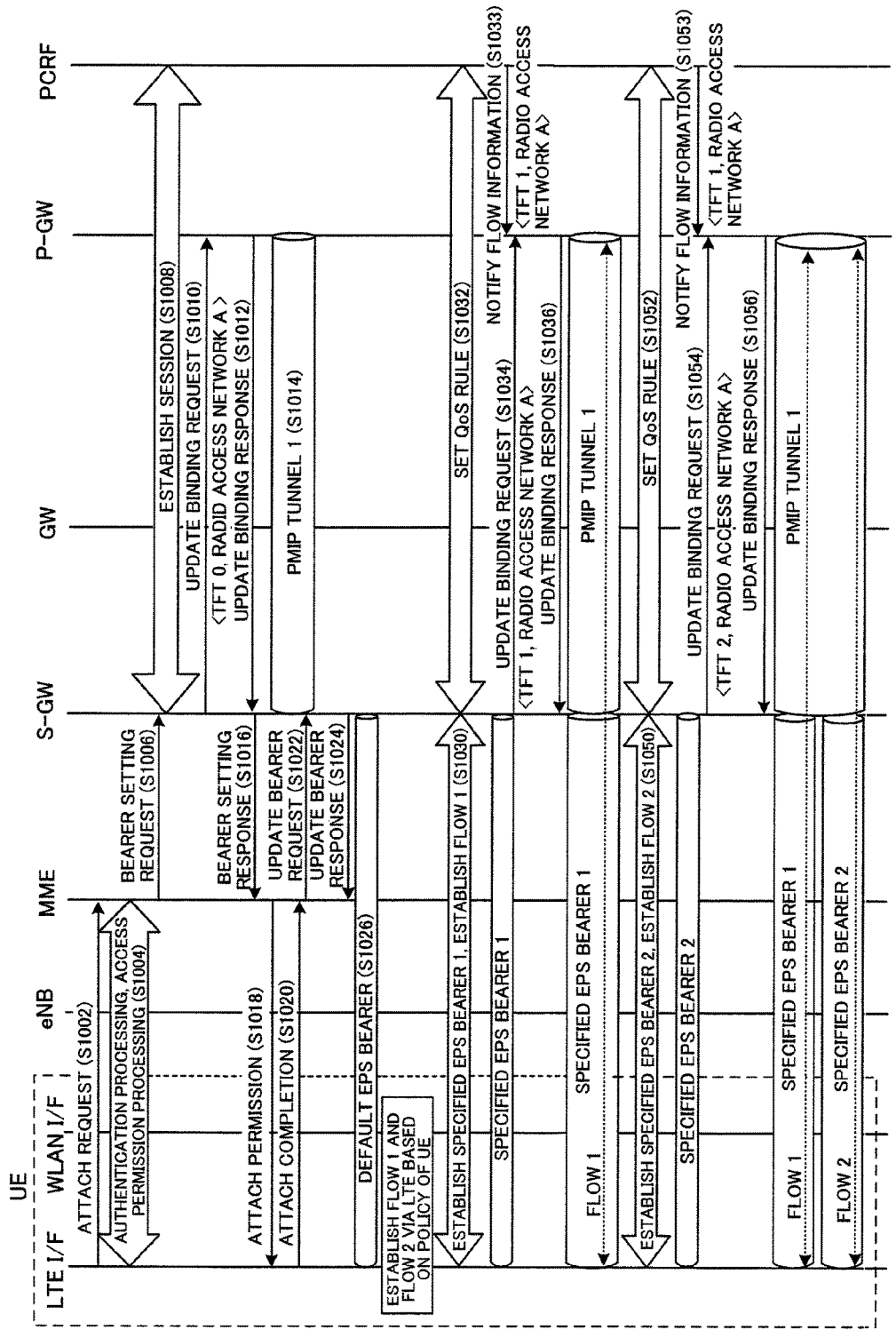
FIG. 11 is a diagram showing an example of an EPS attach sequence of the UE in the first embodiment.

Next, in the network shown in FIG. 1, description will be given for a procedure for the UE 10 to be connected to the core network via the radio access network A and the radio access network B, respectively, with use of FIG. 11.

[1.3.1 UE Attach Processing Via Radio Access Network A]

First, the UE 10 transmits an attach request to the MME 40 via the eNB 70 in accordance with a conventional method provided in non-patent document 2 in order to be connected to the core network via the radio access network A (S1002). In the attach request, identification information of a subscriber (IMSI: International Mobile Subscriber Identify or the like), an APN (Access Point Name) with which a connection destination PDN is identified, UE capability which indicates a possession function of the UE 10 and the like are included.

The MME 40 extracts subscriber identification information included in the attach request according to the conventional method and performs processing of user authentication and access permission (S1004). The MME 40 then transmits a bearer setting request to the S-GW 30 for establishing a default EPS bearer with respect to UE 10 to which connection is permitted (S1006). The bearer setting request includes the IMSI, an IP address of the P-GW 20, and the APN, and the IP address of the P-GW 20 is determined based on the APN. Meanwhile, the default EPS bearer is one of EPS bearers, and is used as a transmission path of a flow which is not linked to a specified EPS bearer.

The S-GW 30 receives the bearer setting request and starts, with between the P-GW 20, a procedure of establishing a PMIP tunnel. The PMIP tunnel is a transmission path which is established for each mobile station between the P-GW 20 and the S-GW 30 as well as between the P-GW 20 and the GW 50.

Specifically, in accordance with the conventional method, first, session establishment is performed with between the PCRF 60 (S1008), and a default traffic TFT (hereinafter referred to as a TFT 0), a required quality of service, and an access system type are notified. Meanwhile, it is assumed that the default TFT is a TFT that all the flows are matched, and the required quality of service is non-GBR.

For the access system type, the radio access network A is designated. Then, in the PCRF 60, as shown in FIG. 10(*a*), as the TFT 0, the access system type, and the quality of service are stored in the flow management list 632 in association with each other.

Further, the S-GW 30 transmits an update binding request to the P-GW 20 (S1010). However, here, differently from the conventional method, the update binding requests include not only an MN_NAI (Mobile Node Network Access Identifier; an identifier of the UE) generated from IMSI but also the TFT 0 and the access system type.

The P-GW 20 receives the update binding request and allocates an HoA to the UE. The P-GW 20 then returns an update binding response to the S-GW 30 (S1012). The HoA is included in a message. Further, a PMIP tunnel 1 is established with between the S-GW 30 (S1014), and as shown in FIG. 8(*a*), binding information 232 is created. Additionally, a flow allocation list 234 is created as shown in FIG. 9(*a*) from the information included in the update binding request.

A procedure thereafter is the same as that of the attach processing in the conventional method. Specifically, the S-GW 30 transmits a bearer setting response to the MME 40 (S1016). The MME 40 receives the bearer setting response and transmits attach permission to the UE 10 via the eNB 70 (S1018).

The UE 10 receives the attach permission and transmits attach completion to the MME 40 via the eNB 70 (S1020). Further, the UE 10 transits to a transmittable/receivable state of user data.

The MME 40 receives the attach completion and transmits an update bearer request including an IP address of the eNB 70 to the S-GW 30 (S1022).

The S-GW 30 returns the update bearer response to the MME 40 (S1024) as well as obtaining the IP address of the eNB 70 to establish a default EPS bearer (S1026).

As mentioned above, the UE 10 completes the attach processing to the core network via the radio access network A. Thereafter, the P-GW 20 receives communication data transmitted from the PDN to the HoA, determines a radio access network to be used with reference to the flow allocation list, and selects a PMIP 1 tunnel as a transmission path based on the binding information. The communication data is then transferred to the S-GW 30 via the PMIP tunnel 1, and thereafter transferred to the UE 10 via the eNB 70 using the default EPS bearer. Similarly, communication data transmitted from the UE 10 to the PDN is also transported through the same transmission path.

[1.3.2 Flow Establishment Processing Via the Radio Access Network A]

Subsequently, the UE 10 establishes two flows (hereinafter referred to as a flow 1 and a flow 2, respectively) toward the PDN. For both of the flows, a higher priority is set for the radio access network A than the radio access network B with, for example, the policy information 132 in the UE 10, therefore the flow 1 and the flow 2 are established via the radio access network A.

A procedure of establishing the flow 1 and the flow 2 are performed in accordance with the conventional method provided in non-patent document 2. Specifically, first, a specified EPS bearer to which a quality of service class which is required by each flow is allocated (hereinafter referred to as a specified EPS bearer 1 and a specified EPS bearer 2) is established (S1030, S1050), and further, the S-GW 30 notifies the PCRF 60 of information of each flow (hereinafter referred to as a TFT 1 and a TFT 2), a quality of service class, and an access system type being used (S1032, S1052).

The PCRF 60 updates the flow management list 632 as shown in FIG. 10(*b*), and further notifies the P-GW 20 by using flow information notification that the TFT 1 and the TFT 2 are established via the radio access network A (S1033, S1053). Meanwhile, in the present embodiment, description is given taking as an example a case where different specified EPS bearers are allocated to the flow 1 and the flow 2, respectively, however, when quality of service classes required by the two flows are the same, one specified EPS bearer may be shared.

Here, differently from the conventional method, the S-GW 30 sequentially transmits to the P-GW 20 an update binding request including the TFT 1 and the TFT 2 as well as an access system type thereof (S1034, S1054). Additionally, the P-GW 20 transmits an update binding response to the S-GW 30 (S1036, S1056).

The P-GW 20 updates the flow allocation list 234 as shown in FIG. 9(*b*) based on the notified flow information. Thereafter, the flow 1 and the flow 2 are transmitted/received between the UE 10 and the PDN via the PMIP tunnel 1 and the allocated specified EPS bearer.

[1.3.3 UE Attach Processing Via Radio Access Network B]

Figure 12:
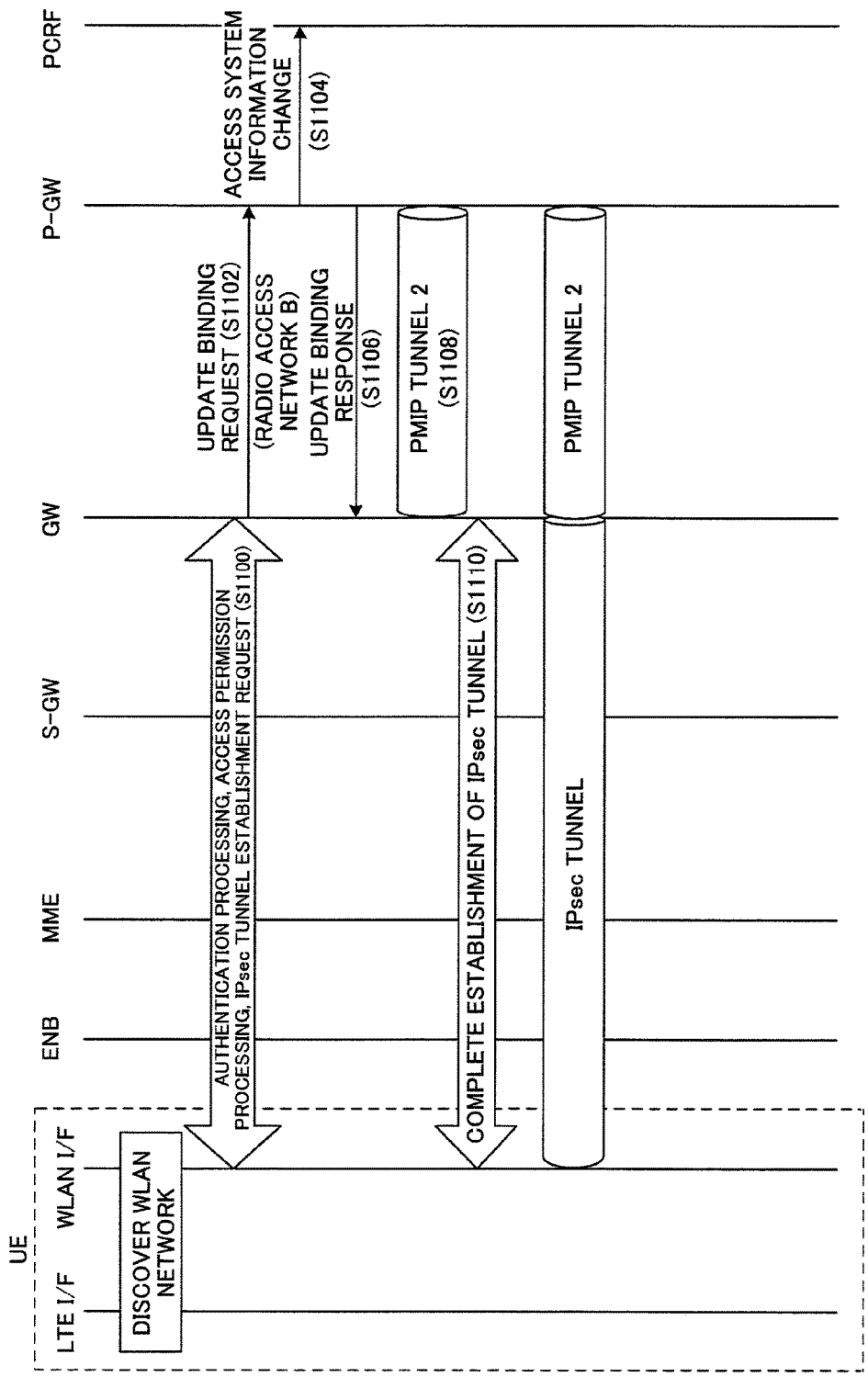
FIG. 12 is a diagram showing an example of an attach sequence to a radio access network B of the UE in the first embodiment.
Figure 13:
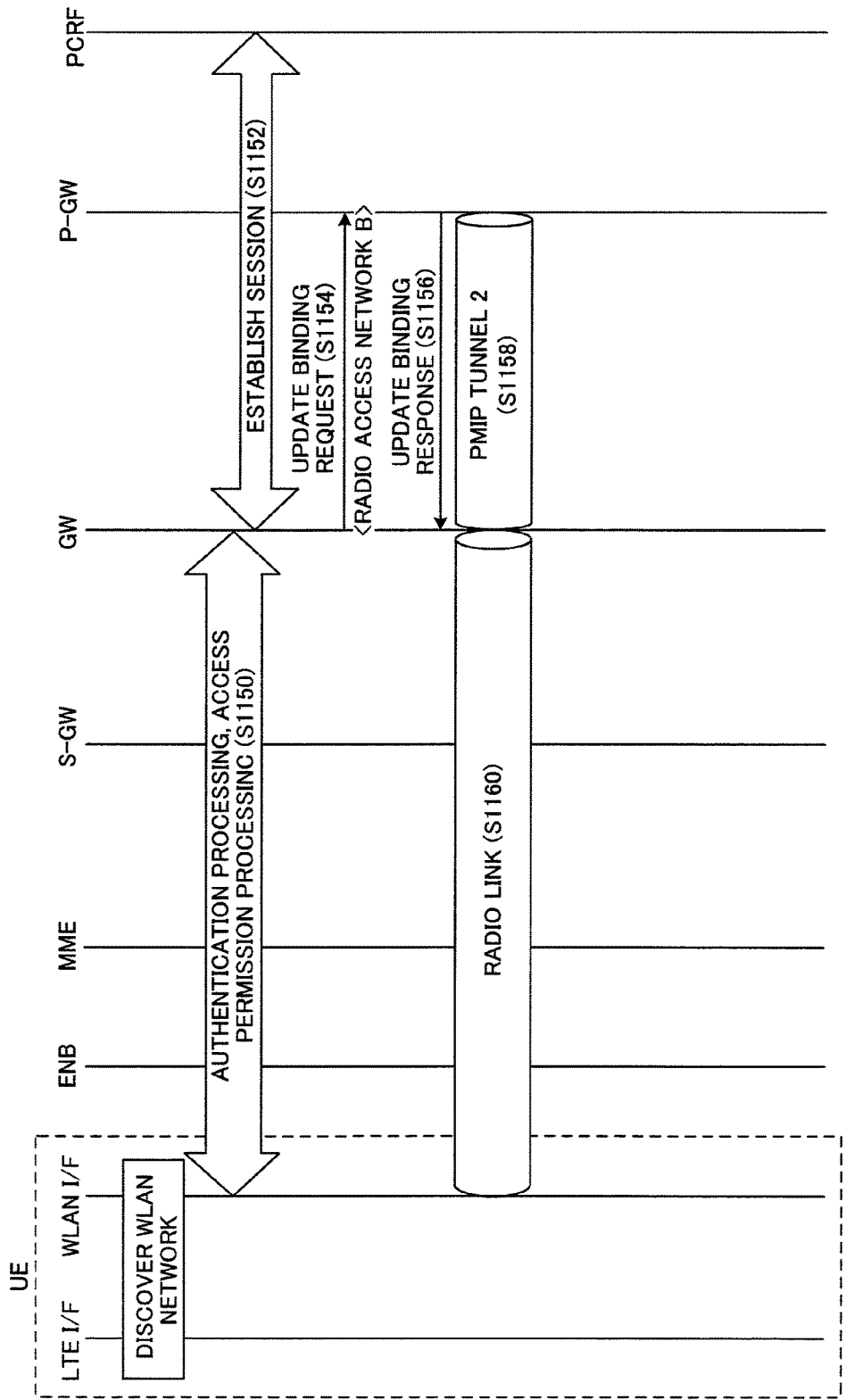
FIG. 13 is a diagram showing an example of an attach sequence to the radio access network B of the UE in the first embodiment.

Subsequently, the UE 10 moves as well as detecting the radio access network B by using the WLAN interface 120, and while maintaining connection with the radio access network A, starts connection processing to the core network as shown in FIG. 12 or FIG. 13 via the radio access network B.

When there is no trust relationship between the core network and the radio access network B, as shown in FIG. 12, the UE 10, in accordance with a procedure of handover between radio access networks provided in non-patent document 2, starts, with between GW 50, authentication/access permission, and establishment processing of an encoding tunnel (hereinafter referred to as an IPsec tunnel) (S1100). Additionally, in the processing, the UE 10 notifies the GW 50 of an HoA and an APN which is connected.

The GW 50 determines an IP address of the P-GW 20 from the notified APN and transmits an update binding request to the P-GW 20 (S1102). However, here, differently from the conventional method, the update binding request includes the access system type (here, assumed to be the radio access network B) in addition to the HoA and the MN_NAI.

The P-GW 20 receives the update binding request and further notifies the PCRF 60 of the access system type (access system information change), and notifies the PCRF 60 that the UE 10 has been connected to a radio access system B (S1104). The PCRF 60 updates the flow management list 632 as shown in FIG. 10(*c*).

The P-GW 20 transmits an update binding response to the GW 50 (S1106), and newly establishes a PMIP tunnel 2 between the P-GW 20 and the GW 50 (S1108), as well as updating the binding information 232 as shown in FIG. 8(*b*). Here, differently from the conventional method, even after the UE 10 is connected to the core network via the radio access network B, the binding information with the PMIP tunnel 1 is left in the binding information 232, and the flow 1 and the flow 2 established based on the flow allocation list still perform communication via the radio access network A.

After receiving the update binding response, the GW 50 establishes an IPsec tunnel with between the UE 10 (S1110).

Thereafter, the IPsec tunnel and the PMIP tunnel 2 serve as transmission paths via the radio access network B.

Whereas, when there is a trust relationship between the core network and the radio access network B, as shown in FIG. 13, the UE 10, in accordance with the procedure of handover between radio access networks provided in non-patent document 2, starts, with between the GW 50, authentication/access permission processing with the GW 50 (S1150). Additionally, in the processing, the UE 10 notifies the GW 50 of an HoA and an APN which is connected.

The GW 50, in accordance with the conventional method, first performs session establishment with between the PCRF 60 and notifies the PCRF 60 of the access system type (S1152). The PCRF 60 thereby recognizes that the UE 10 has been newly connected also via the radio access network B and updates the flow management list 632 as shown in FIG. 10(c).

Further, the GW 50 determines an IP address of the P-GW 20 from the notified APN and transmits an update binding request to the P-GW 20 (S1154). However, here, differently from the conventional method, the update binding request includes the access system type (here, assumed to be the radio access network B) in addition to the HoA and the MN_NAI.

The P-GW 20 receives the update binding request and transmits an update binding response to the GW 50 (S1156). Then, the PMIP tunnel 2 is newly established between the P-GW 20 and the GW 50 (S1158), as well as updating the binding information 232 as shown in FIG. 8(b). Here, differently from the conventional method, even after the UE 10 is connected to the core network via the radio access network B, the binding information with the PMIP tunnel 1 is left in the binding information 232, and the flow 1 and the flow 2 established based on the flow allocation list still perform communication via the radio access network A.

After receiving the update binding response, the GW 50 establishes a radio link with between the UE 10 and thereafter the radio link and the PMIP tunnel 2 serve as transmission paths via the radio access network B (S1160).

As mentioned above, the UE 10 completes attach processing via the radio access network B and is connected to the core network via the two radio access networks. Meanwhile, when the S-GW 30 transmits the update binding request, by including a default TFT, a flow not corresponding to the flow 1 and the flow 2 is able to be designated so as to be communicated via the radio access network B. In that case, after attach processing via the radio access network B is completed, a transmission path of a flow which corresponds to the default TFT is immediately switched.

[1.3.4 Switching Proceeding to Radio Access Network B of Flow 2]

Here, it is assumed that a number of other mobile stations are connected to the core network via the radio access network A, and as a result, the radio access network A has become a congestion state.

The PCRF 60 detects that a number of flows are generated via the radio access network A to be in a congestion state based on the flow management list 632 being managed and a quality of service class of a specified EPS bearer which is required in QoS rule setting with the S-GW 30. Determination is then made so that the UE 10 which is simultaneously connected to the radio access network A and the radio access network B switches a flow established via the radio access network A to the radio access network B where congestion is not generated. Meanwhile, means of detecting of being the congestion state is not limited to the above-described means, and for example, detection may be performed by notification from other apparatuses in the mobile communication system.

As to a selection standard of a flow to be switched, for example, it is considered that the quality of service class required by the flow is available also in the radio access network B, or a utilization band of the flow is so large that, by switching the flow to the radio access network B, it is expected that a larger number of mobile stations are able to be accommodated by the radio access network A, and so on, however, not limited thereto, it is enough as long as a method is to select a flow which seems to be most appropriate to be switched to the radio access network B from the viewpoint of the manager of the mobile communication system.

In the present embodiment below, a case where the flow 2 serving as file download traffic is switched to the radio access network B is taken as an example, and a first flow switching procedure which will be described next is executed. Meanwhile, the first flow switching procedure is composed of a first uplink traffic switching procedure and a first downlink traffic switching procedure, and there are a plurality of processing examples as described below.

[1.3.4.1 First Flow Switching Procedure (First Processing Example)]

Figure 14:
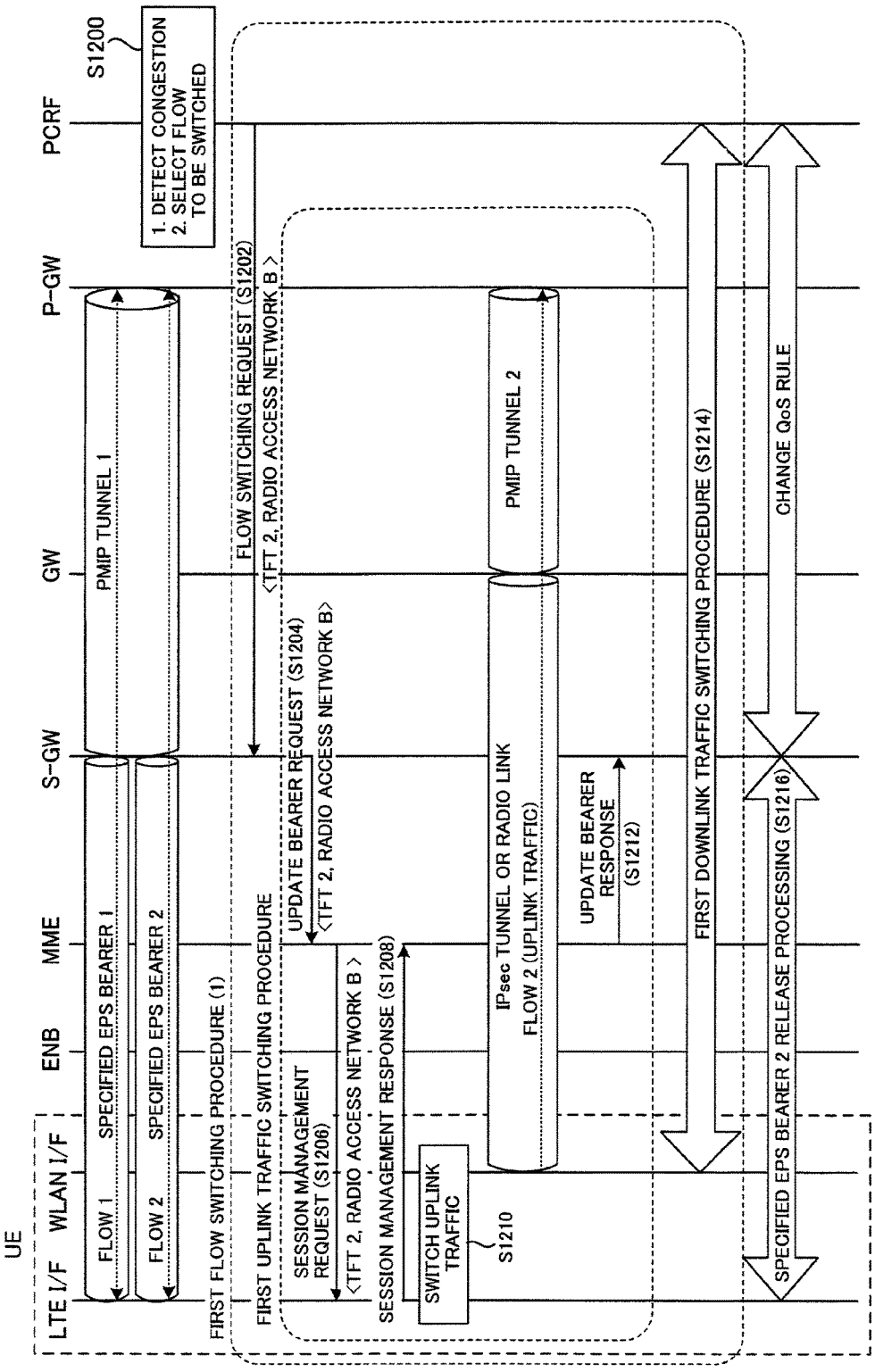
FIG. 14 is a diagram showing a first processing example of a network-initiated first flow switching procedure from a radio access network A to the radio access network B in the first embodiment.

FIG. 14 shows a first processing example of the first flow switching procedure. First, the PCRF 60, when detecting congestion, selects a flow to be switched (S1200). A flow switching request is then transmitted to the S-GW 30 (S1202). The flow switching request includes a TFT 2 indicating the flow 2 and an access system type of a switching destination (here, assumed to be the radio access network B).

The S-GW 30 receives a flow switching request and performs a first uplink traffic switching procedure described below. First, the S-GW 30 transmits an update bearer request to the MME 40 (S1204). The update bearer request includes the TFT 2 and the above-described access system type.

The MME 40 receives the update bearer request and transfers a session management request including the TFT 2 and the above-described access system type to the UE 10 via the eNB 70 (S1206).

The UE 10 receives the session management request, refers to the TFT 2 and the access system type included therein, transmits a session management response to the MME 40 via the eNB 70 (S1208), and makes a change so as to transmit via an access system type to which uplink traffic of the corresponding flow 2 is designated, that is, via the radio access network B (S1210). The MME 40 then transmits an update bearer response to the S-GW 30 (S1212).

The S-GW 30, by receiving the update bearer response, confirms that the UE 10 has switched a transmission path of the flow 2 to the radio access network B, and as mentioned above, the first uplink traffic switching procedure is completed. Next, the S-GW 30 executes the first downlink traffic switching procedure described below (S1214). Description will hereinafter be given for a plurality of processing examples as to the first downlink traffic switching procedure.

[1.3.4.1.1 First Downlink Traffic Switching Procedure (First Processing Example)]

Figure 15:
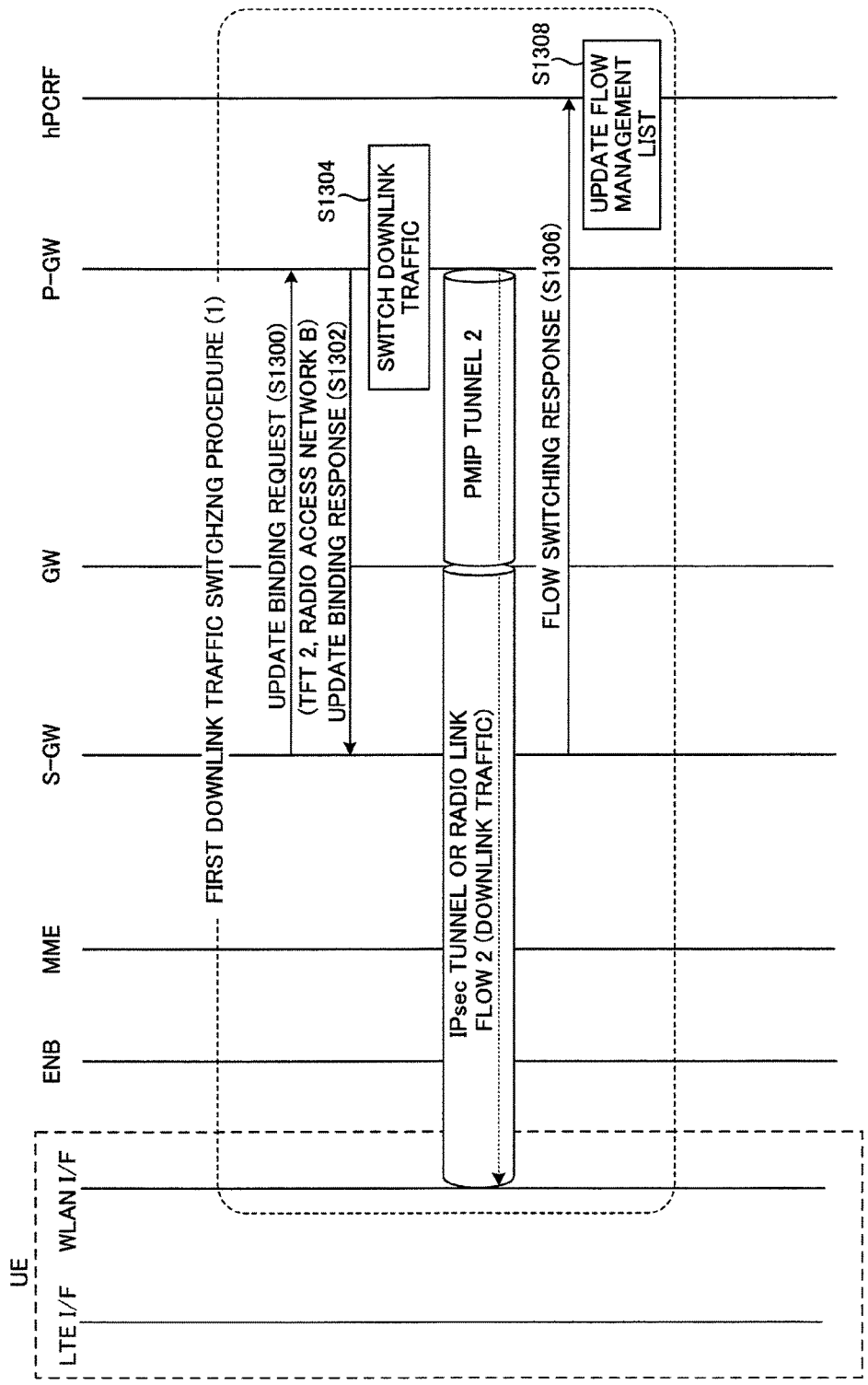
FIG. 15 is a diagram showing a first processing example of a first downlink traffic switching procedure from the radio access network A to the radio access network B in the first embodiment.

FIG. 15 shows a first processing example of the first downlink traffic switching procedure.

The S-GW 30 transmits an update binding request including a TFT 2 and an access system type of a switching destination (that is, the radio access network B) to the P-GW 20 (S1300).

The P-GW 20, based on the received update binding request, updates the flow allocation list 234 as shown in FIG. 9(*c*), and transmits an update binding response to the S-GW 30 (S1302). Thereafter, a flow corresponding to the TFT2, when received from the PDN, is transferred to the GW 50 via a PMIP 2 tunnel and changed so as to be transmitted to the UE 10 via the radio access network B (S1304).

The S-GW 30 receives the update binding response, confirms that a transmission path is switched also for downlink traffic, and transmits a flow switching response to the PCRF 60 (S1306). The PCRF 60 receives the flow switching response and updates the flow management list 632 as shown in FIG. 10(*d*) (S1308).

Meanwhile, in the present processing example, description is given taking as an example a case where the downlink traffic switching procedure is started after completing the first uplink traffic switching procedure, however, differently therefrom, after receiving the flow switching request from the PCRF 60 (S1202), first, the first processing example of the first downlink traffic switching procedure is performed, and the first uplink traffic switching procedure may be performed before performing transmission of a flow switching response to the PCRF 60 (S1306).

[1.3.4.1.2 First Downlink Traffic Switching Procedure (Second Processing Example)]

Figure 16:
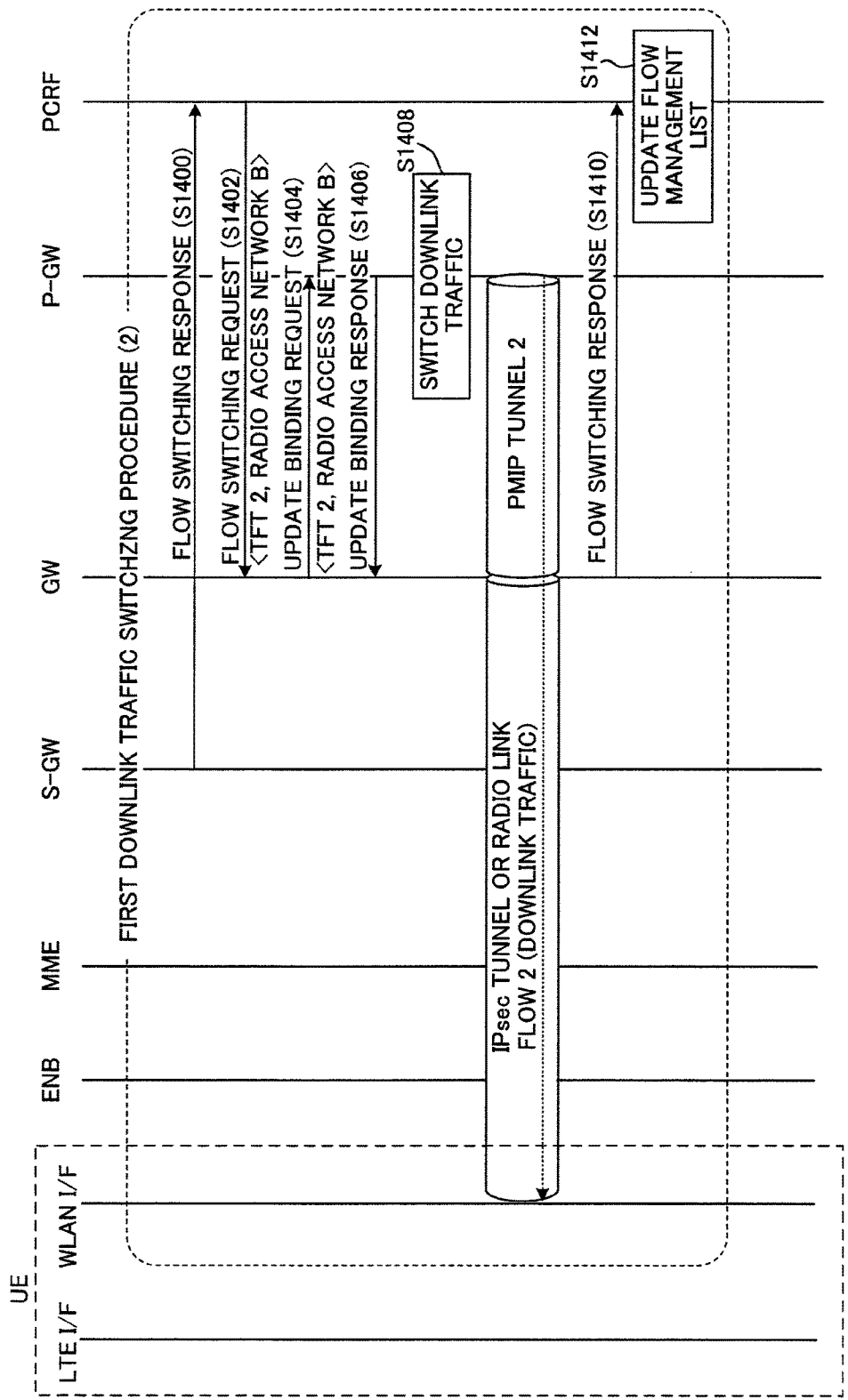
FIG. 16 is a diagram showing a second processing example of the first downlink traffic switching procedure from the radio access network A to the radio access network B in the first embodiment.

FIG. 16 shows a second processing example of the first downlink traffic switching procedure. Meanwhile, the second processing example is different from the first processing example in that the GW 50 of a switching destination access network of a flow transmits an update binding request.

First, the S-GW 30 transmits a flow switching response to the PCRF 60 and notifies that switching of uplink traffic is completed (S1400).

The PCRF 60 which has received the flow switching response transmits a flow switching request to the GW 50 (S1402). The flow switching request includes a TFT 2 and an access system type of a switching destination (that is, the radio access network B).

The GW 50 receives the flow switching request and transmits the update binding request including the TFT 2 and the above-described access system type to the P-GW 20 in order to update the binding information 232 in the P-GW 20 (S1404).

The P-GW 20, based on the received update binding request, updates the flow allocation list 234 as shown in FIG. 9(*c*) and transmits an update binding response to the GW 50 (S1406). Thereafter, a flow corresponding to the TFT 2, when received from the PDN, is transferred to the GW 50 via the PMIP 2 tunnel and changed so as to be transmitted to the UE 10 via the radio access network B (S1408). The GW 50 then transmits a flow switching response to the PCRF 60 (S1410), and the PCRF 60 updates the flow management list 632 as shown in FIG. 10(*d*) (S1412).

Meanwhile, in the present processing example, description is given taking as an example a case where a second processing example of a first downlink traffic switching procedure is started after the first uplink traffic switching procedure is completed, however, differently therefrom, first, after S1200, the PCRF 60 transmits the flow switching request to the GW 50 (S1402), the second processing example of the first downlink traffic switching procedure is performed (S1410), and thereafter the first uplink traffic switching procedure may be performed by starting S1202.

[1.3.4.1.3 First Downlink Traffic Switching Procedure (Third Processing Example)]

Figure 17:
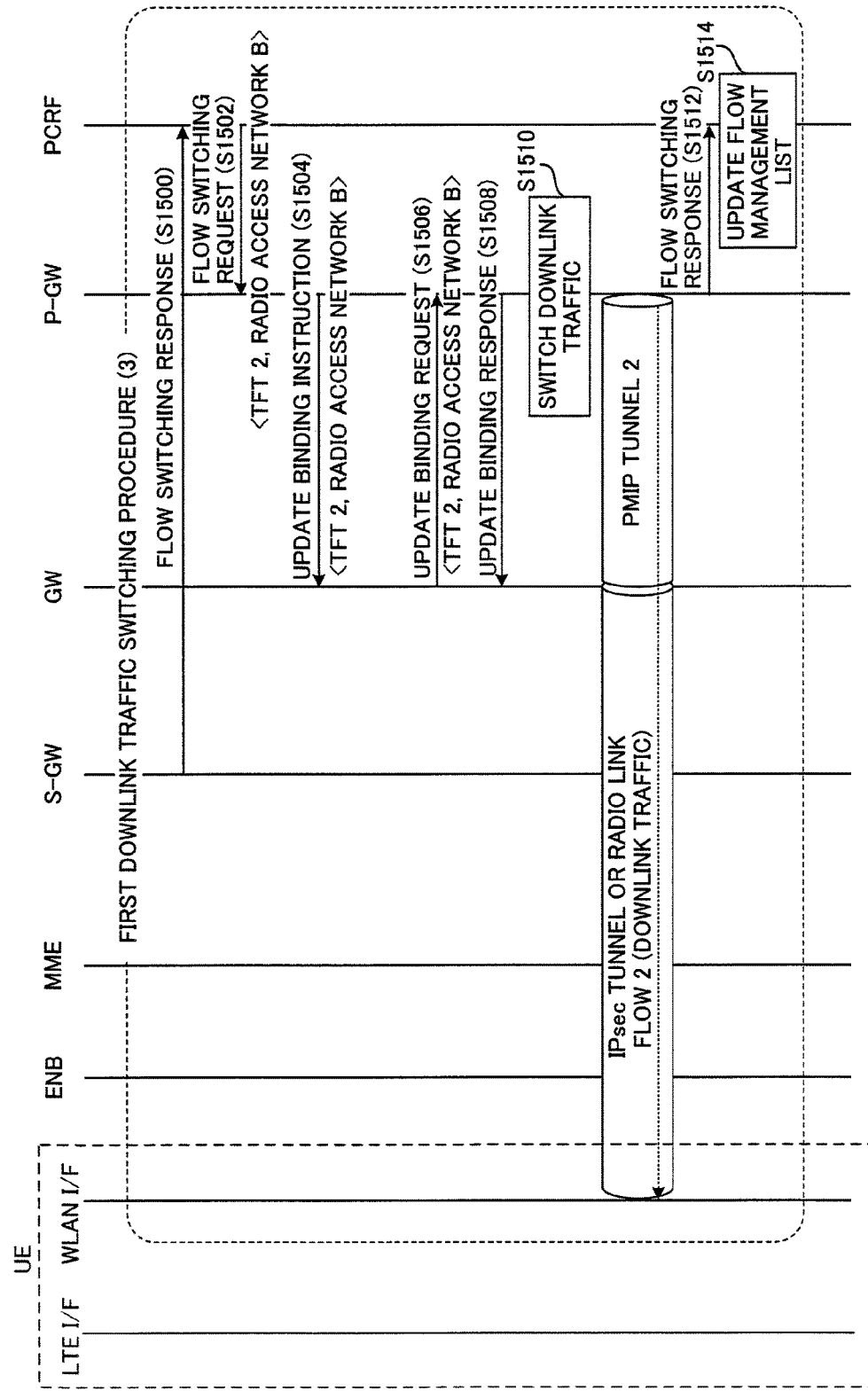
FIG. 17 is a diagram showing a third processing example of the first downlink traffic switching procedure from the radio access network A to the radio access network B in the first embodiment.

FIG. 17 shows a third processing example of the first downlink traffic switching procedure. Meanwhile, the third processing example is different from the first processing example in that a flow switching instruction is given via the P-GW 20 since there is no interface directly communicating between the PCRF 60 and the GW 50.

First, the S-GW 30 transmits a flow switching response to the PCRF 60 and notifies that switching of uplink traffic is completed (S1500).

Having received the flow switching response, the PCRF 60 subsequently transmits a flow switching request to the P-GW 20 (S1502). The flow switching request includes a TFT 2 and an access system type of a switching destination.

The P-GW 20 receives the flow switching request and transmits to the GW 50 an update binding instruction including the TFT 2 and the above-described access system type so as to cause the GW 50 to transmit an update binding request (S1504).

The GW 50, in accordance with the received update binding instruction, transmits the update binding request to the P-GW 20.

The P-GW 20, based on the received update binding request, updates the flow allocation list 234 as shown in FIG. 9(*c*), and transmits an update binding response to the GW 50 (S1508). Thereafter, a flow corresponding to the TFT 2, when received from the PDN, is transferred to the GW 50 via the PMIP 2 tunnel and changed so as to be transmitted to the UE 10 via the radio access network B (S1510). Then the flow switching response is transmitted to the PCRF 60, completion of switching of the flow 2 is notified (S1512), and the PCRF 60 updates the flow management list 632 as shown in FIG. 10(*d*) (S1514).

Meanwhile, in the present example, description is given for a case where the third processing example of the first downlink traffic switching procedure is started after the first uplink traffic switching procedure is completed, however, differently therefrom, first, after S1200, the PCRF 60 transmits the flow switching request to the P-GW 20 (S1502), the third processing example of the first downlink traffic switching procedure is performed (S1512), and thereafter the first uplink traffic switching procedure may be performed by starting S1202.

By executing any of the first downlink traffic switching procedures as described above (the first processing example to the third processing example), the downlink traffic switching procedure is completed and the first flow switching procedure is completed.

[1.3.4.2 First Flow Switching Procedure (Second Processing Example)]

Figure 18:
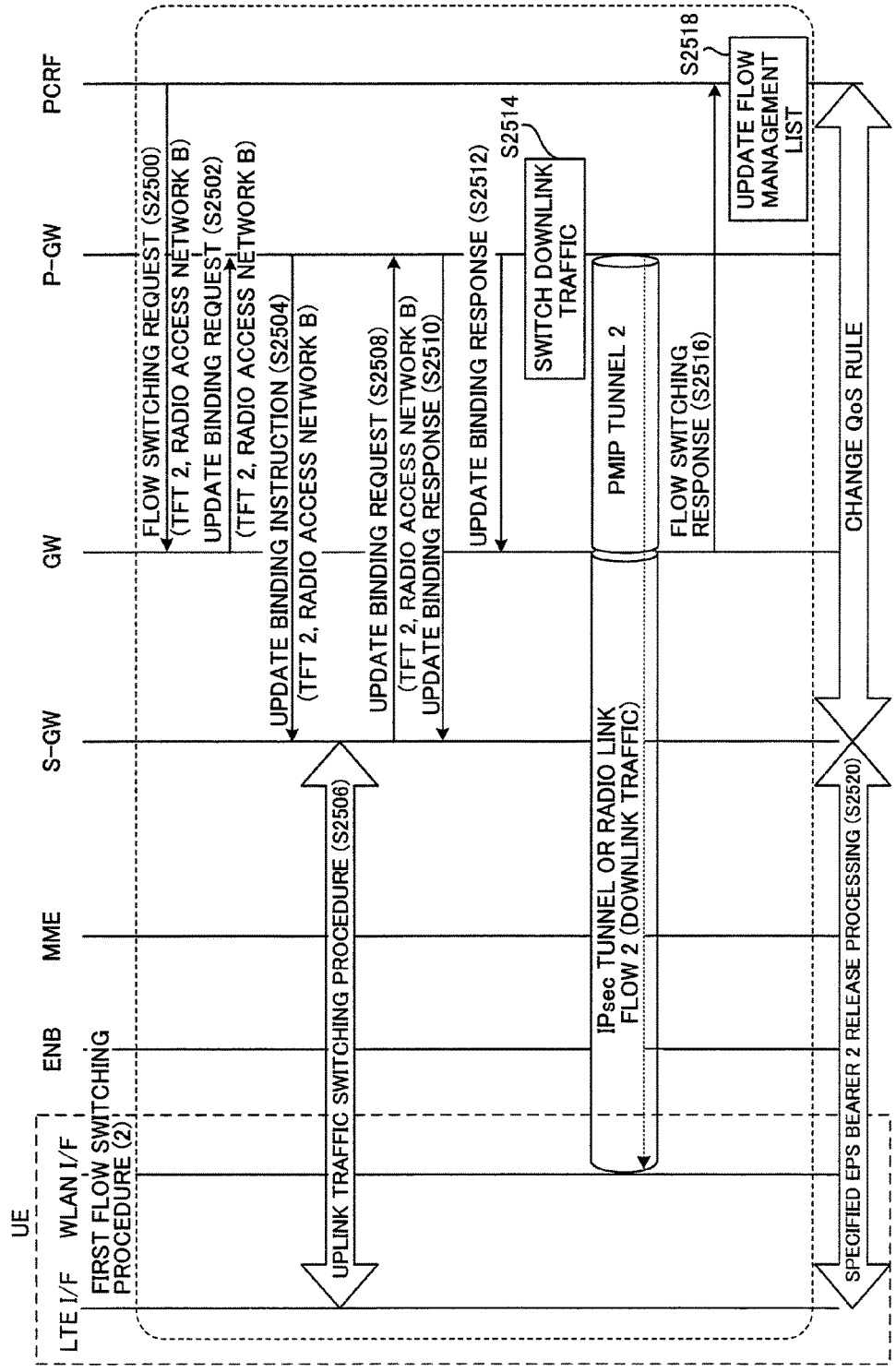
FIG. 18 is a diagram showing a second processing example of the first flow switching procedure from the radio access network A to the radio access network B in the first embodiment.

FIG. 18 shows a second processing example of the first flow switching procedure. The present processing example is different from the first processing example in that the uplink traffic switching procedure is performed during the downlink traffic switching procedure.

First, the PCRF 60 transmits a flow switching request to the GW 50 (S2500). The flow switching request includes a TFT 2 indicating the flow 2 and an access system type of a switching destination (here, assumed to be the radio access network B).

The GW 50 receives the flow switching request and transmits an update binding request including the TFT 2 and the above-described access system type in order to update the binding information 232 in the P-GW 20, to P-GW 20 (S2502).

The P-GW 20, based on the received update binding request, refers to the flow allocation list 234, confirms that the flow 2 is established via the radio access network A, and transmits an update binding instruction to the S-GW 30

(S2504). The update binding instruction includes the TFT 2 and the radio access network B as an access system type.

The S-GW 30 receives the update binding instruction and performs the aforementioned first uplink traffic switching procedure so that the flow 2 is transmitted via the radio access network B (S2506). Then an update binding request is transmitted to the P-GW 20 (S2508). Here, the update binding request includes the TFT 2 and the radio access network B as an access system type.

The P-GW 20, based on the received update binding request, updates the flow allocation list 234 as shown in FIG. 9(*c*), and transmits an update binding response (S2510, S2512). Thereafter, a flow corresponding to the TFT 2, when received from the PDN, is transferred to the GW 50 via the PMIP 2 tunnel and changed so as to be transmitted to the UE 10 via the radio access network B (S2514). Then the GW 50 transmits a flow switching response to the PCRF 60 (S2516), and the PCRF 60 updates the flow management list 632 as shown in FIG. 10 (*d*) (S2518).

As mentioned above, the downlink traffic switching procedure is completed and the first flow switching procedure is completed.

The flow 2, in both the uplink traffic and the downlink traffic, is thereby transmitted via the radio access network B so that an amount of user data which is processed on the radio access network A is reduced.

Meanwhile, when a specified EPS bearer 2 is no longer required by switching the flow 2 to the radio access network B, in accordance with a procedure provided in non-patent document 2, it is assumed that a release procedure of the specified EPS bearer 2 is performed, initiated by the PCRF 60 (S1216, S2520).

[1.3.5 Switching Processing of Flow 2 to Radio Access Network A]

Further, thereafter, congestion is generated on the radio access network B, and in order to perform switching of the flow from the radio access network B to the radio access network A, initiated by a network, a second flow switching procedure described below is executed. Meanwhile, the second flow switching procedure is composed of a second uplink traffic switching procedure and a second downlink traffic switching procedure, and there are a plurality of processing examples as described below.

[1.3.5.1 Second Flow Switching Procedure (First Processing Example)]

Figure 19:
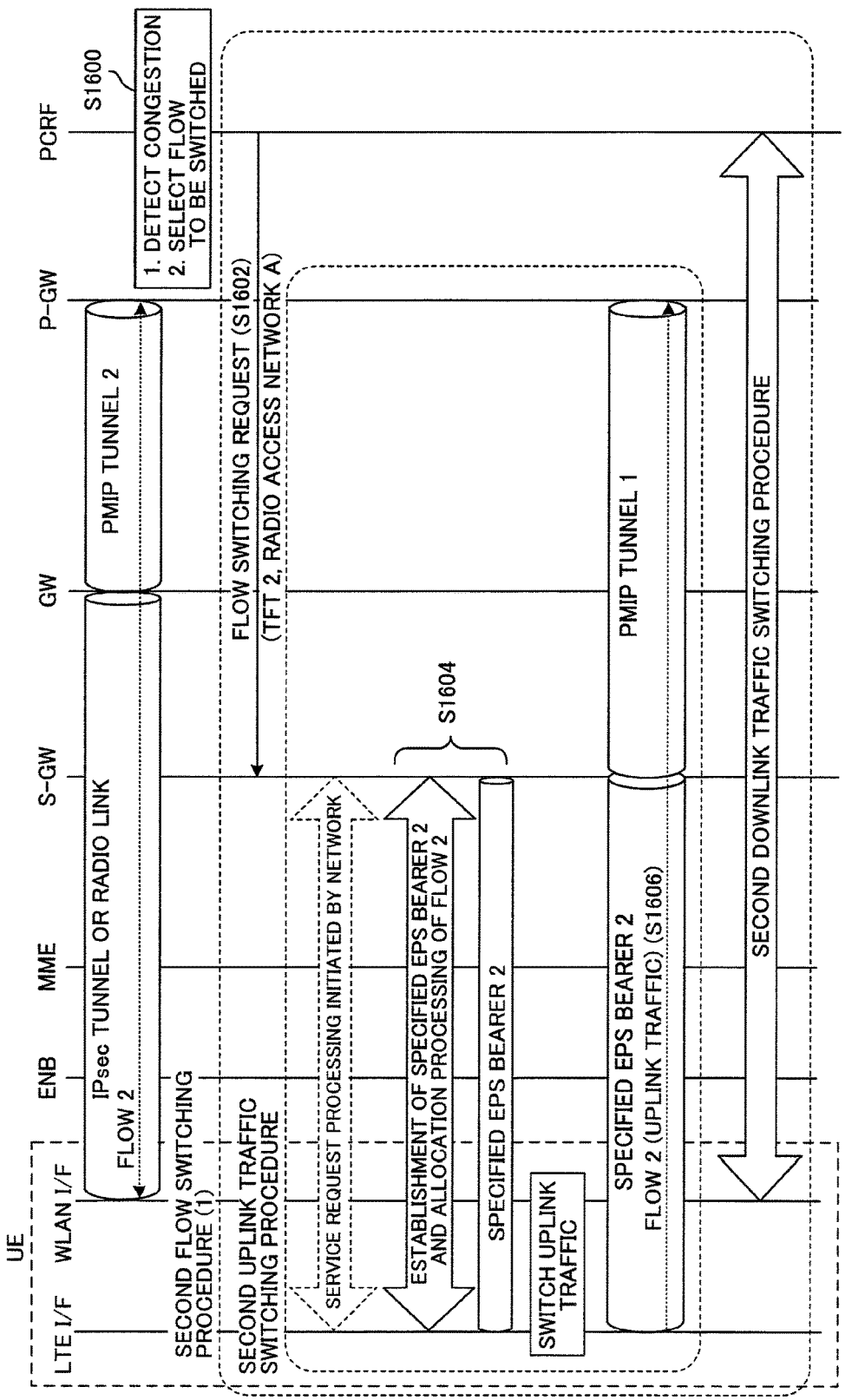
FIG. 19 is a diagram showing a first processing example of a network-initiated second flow switching procedure from the radio access network B to the radio access network A in the first embodiment.

FIG. 19 shows a first processing example of the second flow switching procedure. Similarly to the aforementioned switching procedure of the flow from the radio access network A to the radio access network B, the PCRF 60 selects a flow to be moved. Here, it is assumed that the flow 2 is selected (S1600).

First, the PCRF 60 transmits a flow switching request to the S-GW 30 (S1602). The flow switching request includes the TFT 2 indicating the flow 2 and an access system type of a switching destination (here, assumed to be the radio access network A).

The S-GW 30 receives the flow switching request and performs a second uplink traffic switching procedure as described below. First, the S-GW 30 establishes a specified EPS bearer for the TFT 2 (hereinafter referred to as a specified EPS bearer 2) to the UE 10 (S1604). Meanwhile, here, when the UE 10 transits to an idle mode (mode in which transmission/reception of user data via the radio access network A is not possible), it is assumed that a service request initiated by a network (paging processing to the UE 10) is started in accordance with the conventional method, and the UE 10 is transited to an active mode (mode in which transmission/reception of user data via the radio access network A is possible).

After the specified EPS bearer 2 is established, the UE 10 transmits the flow of the TFT 2 via the radio access network A (S1606). As described above, the second uplink traffic switching procedure is completed.

The S-GW 30 confirms that the specified EPS bearer is established, and further, in order to update the flow allocation list in the P-GW 20, executes a second downlink traffic switching procedure described below, switches to the specified EPS bearer 2 also for the downlink traffic and performs communication.

Description will hereinafter be given for a plurality of processing examples of the second downlink traffic switching procedure.

[1.3.5.1.1 Second Downlink Traffic Switching Procedure (First Processing Example)]

Figure 20:
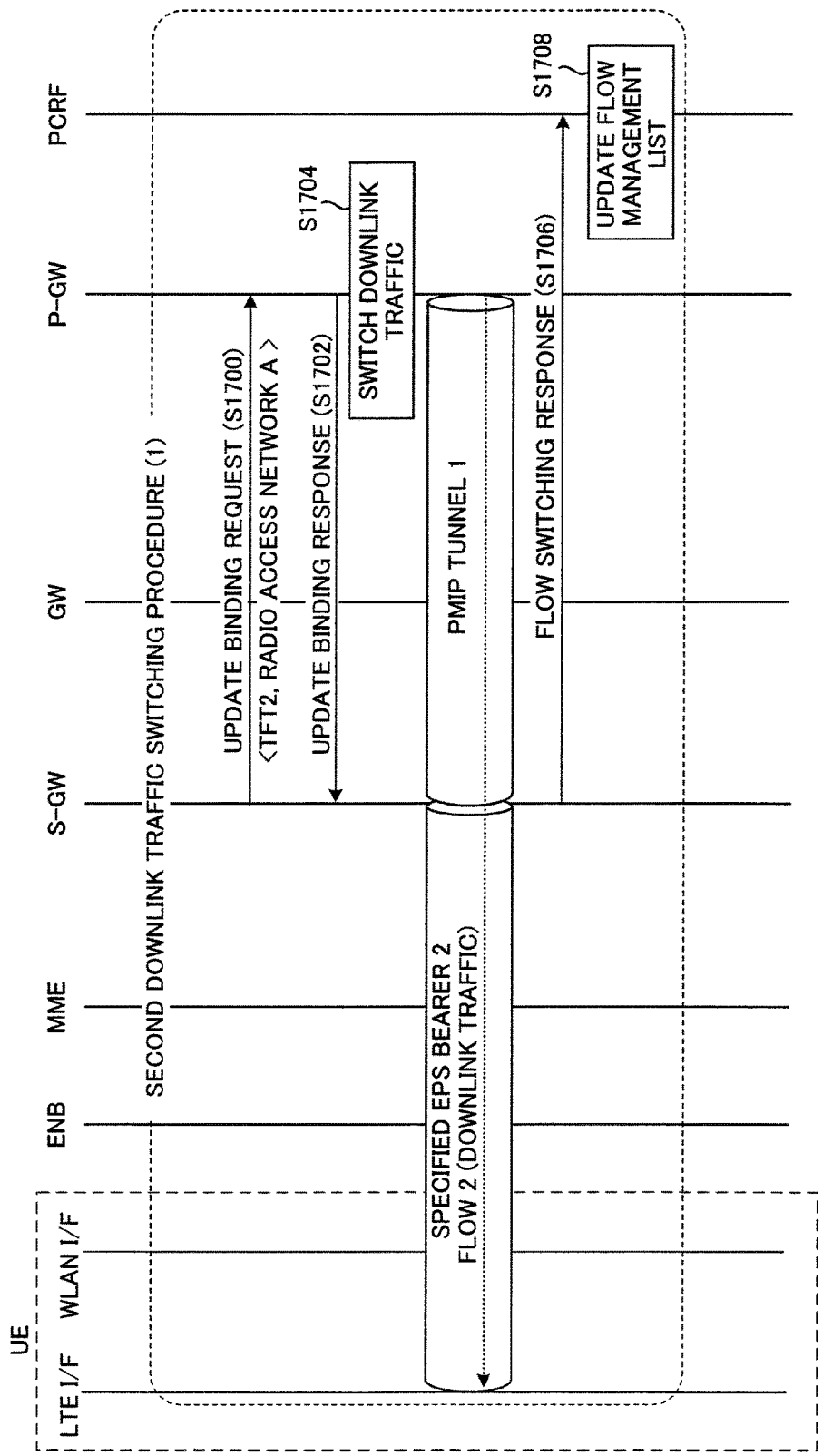
FIG. 20 is a diagram showing a first processing example of a second downlink traffic switching procedure from the radio access network B to the radio access network A in the first embodiment.

FIG. 20 shows a first processing example of the second downlink traffic switching procedure.

First, the S-GW 30 transmits an update binding request including the TFT 2 and the above-described access system type of the switching destination to the P-GW 20 (S1700).

The P-GW 20, based on the received update binding request, updates the flow allocation list 234 as shown in FIG. 9(*b*), and transmits an update binding response to the GW 50 (S1702). Thereafter, a flow corresponding to the TFT 2, when received from the PDN, is transferred to the S-GW 30 via the PMIP 1 tunnel and changed so as to be transmitted to the UE 10 via the radio access network A (S1704).

The S-GW 30 receives the update binding response, confirms that a transmission path is switched also for downlink traffic, and transmits a flow switching response to the PCRF 60 (S1706). The PCRF 60 receives the flow switching response and updates the flow management list 632 as shown in FIG. 10(*c*) (S1708). Meanwhile, in the present processing example, description is given for a case where the first processing example of the second downlink traffic switching procedure is started after completing the second uplink traffic switching procedure, however, differently therefrom, after receiving the flow switching request from the PCRF 60 (S1602), first, the first processing example of the second downlink traffic switching procedure is performed, and the second uplink traffic switching procedure may be performed before performing transmission of the flow switching response to the PCRF 60 (S1706).

[1.3.5.1.2 Second Downlink Traffic Switching Procedure (Second Processing Example)]

Figure 21:
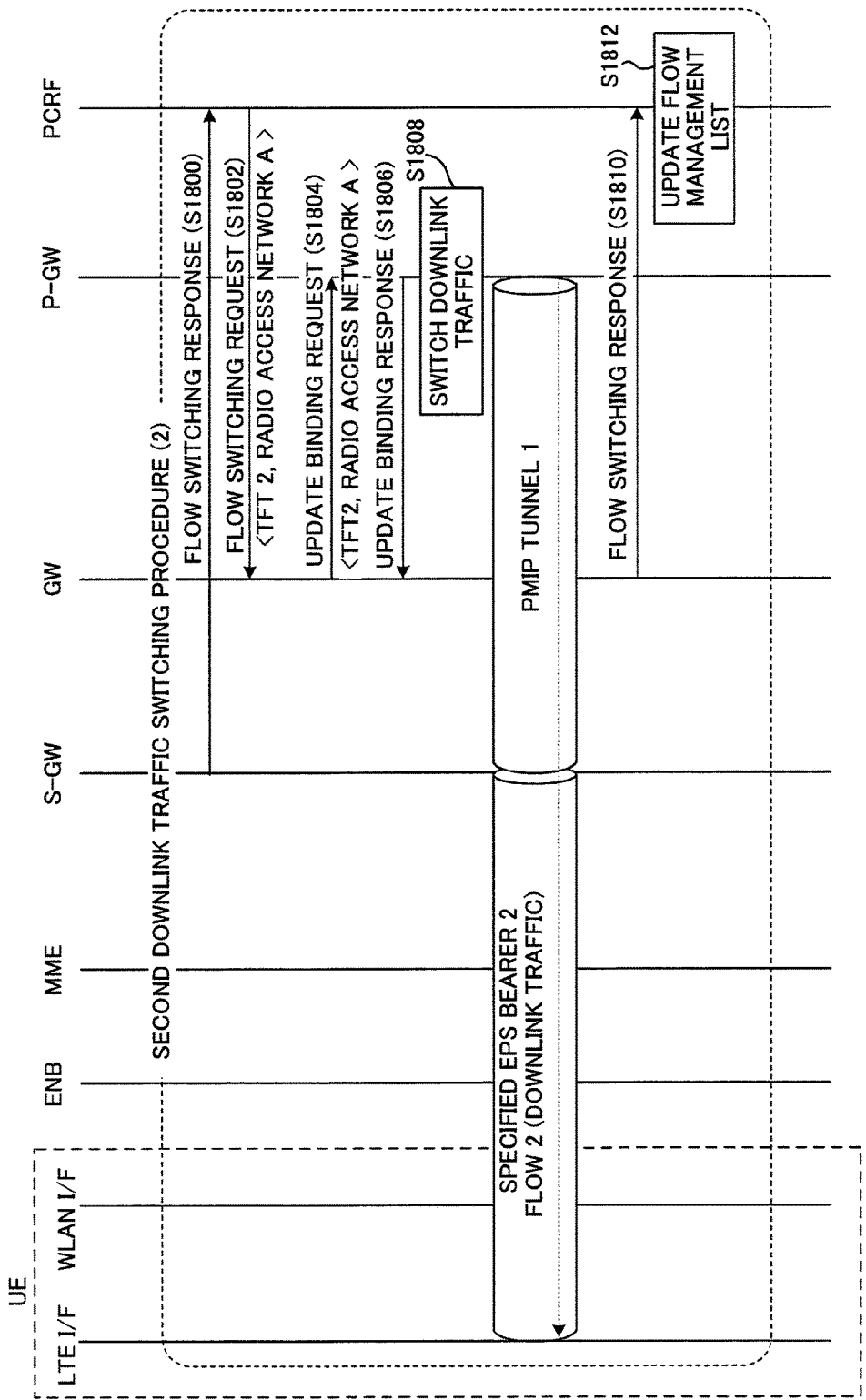
FIG. 21 is a diagram showing a second processing example of the second downlink traffic switching procedure from the radio access network B to the radio access network A in the first embodiment.

FIG. 21 shows a second processing example of the second downlink traffic switching procedure. Meanwhile, the second processing example is different from the first processing example in that the GW 50 of a flow switching source access network transmits an update binding request.

First, the S-GW 30 transmits a flow switching response to the PCRF 60 and notifies that switching of uplink traffic is completed (S1800).

The PCRF 60 then transmits a flow switching request to the GW 50 (S1802). The flow switching request includes a TFT 2 and an access system type of a switching destination (that is, the radio access network A).

The GW 50 receives the flow switching request and transmits to the P-GW 20 an update binding request including the TFT 2 and the above-described access system type in order to update the binding information 232 in the P-GW 20 (S1804).

The P-GW 20, based on the received update binding request, updates the flow allocation list 234 as shown in FIG.

9(b) and transmits an update binding response to the GW 50 (S1806). Thereafter, a flow corresponding to the TFT 2, when received from the PDN, is transferred to the S-GW 30 via the PMIP 1 tunnel and changed so as to be transmitted to the UE 10 via the radio access network A (S1808).

The GW 50 then transmits the flow switching response to the PCRF 60 (S1810), and the PCRF 60 updates the flow management list 632 as shown in FIG. 10(c) (S1812). Meanwhile, in the present processing example, description is given for a case where the second processing example of the second downlink traffic switching procedure is started after completing the second uplink traffic switching procedure, however, differently therefrom, first, the PCRF 60 transmits the flow switching request to the GW 50 (S1802), and after the second processing example of the second downlink traffic switching procedure is performed, the second uplink traffic switching procedure may be performed by starting S1602.

[1.3.5.1.3 Second Downlink Traffic Switching Procedure (Third Processing Example)]

Figure 22:
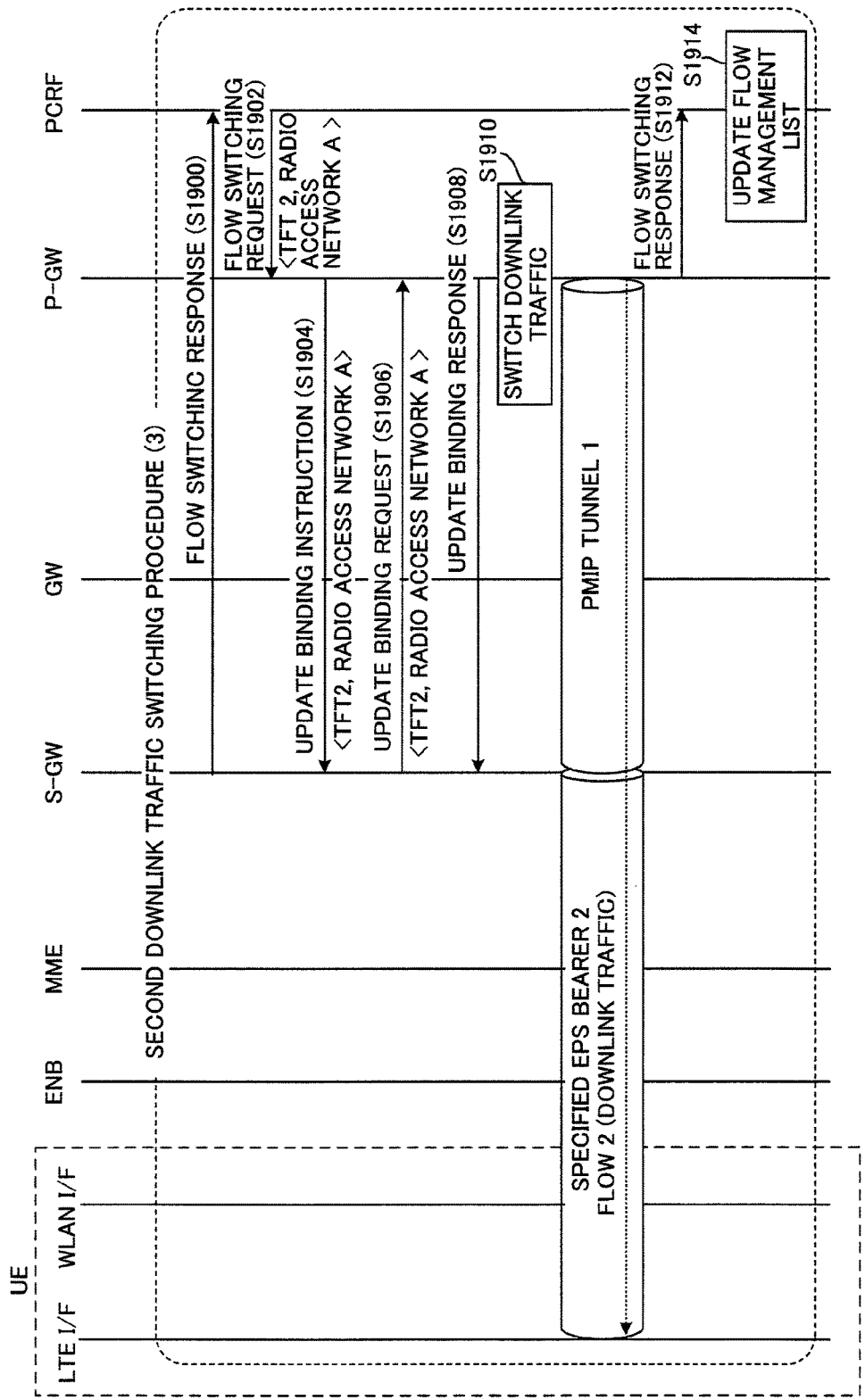
FIG. 22 is a diagram showing a third processing example of the second downlink traffic switching procedure from the radio access network B to the radio access network A in the first embodiment.

FIG. 22 shows a third processing example of the second downlink traffic switching procedure. Meanwhile, the third processing example is different from the first processing example in that a flow switching instruction is given via the P-GW 20 since there is no interface directly communicating between the PCRF 60 and the GW 50.

First, the S-GW 30 transmits a flow switching response to the PCRF 60 and notifies that switching of uplink traffic is completed (S1900).

The PCRF 60 then transmits a flow switching request to the P-GW 20 (S1902). The flow switching request includes a TFT 2 and an access system type of a switching destination.

The P-GW 20 receives the flow switching request and transmits to the S-GW 30 an update binding instruction including the TFT 2 and the above-described access system type so as to cause the S-GW 30 to transmit an update binding request (S1904).

The S-GW 30, in accordance with the received update binding instruction, transmits to the P-GW 20 the update binding request including the TFT 2 and the above-described access system type in order to update the binding information 232 in the P-GW 20 (S1906).

The P-GW 20 updates the flow allocation list 234 as shown in FIG. 9(b), and transmits the update binding response to the S-GW 30 (S1908). Thereafter, a flow corresponding to the TFT 2, when received from the PDN, is transferred to the S-GW 30 via the PMIP tunnel 1 and changed so as to be transmitted to the UE 10 via the radio access network A (S1910). Then, the flow switching response is transmitted to the PCRF 60 (S1912), and completion of switching of the flow 2 is notified. The PCRF 60 then updates the flow management list 632 as shown in FIG. 10(c) (S1914).

Meanwhile, in the present processing example, description is given for a case where a third processing example of the second downlink traffic switching procedure is started after the second uplink traffic switching procedure is completed, however, differently therefrom, first, the PCRF 60 transmits the flow switching request to the P-GW 20 (S1902), the third processing example of the second downlink traffic switching procedure is performed, and thereafter the second uplink traffic switching procedure may be performed by starting S1602.

By executing any of the second downlink traffic switching procedure as described above, the downlink traffic switching procedure is completed. The flow 2, in both the uplink traffic and the downlink traffic, is thereby transmitted via the radio access network A. As described above, the first processing example of the second flow switching procedure is completed.

[1.3.5.2 Second Flow Switching Procedure (Second Processing Example)]

Figure 23:
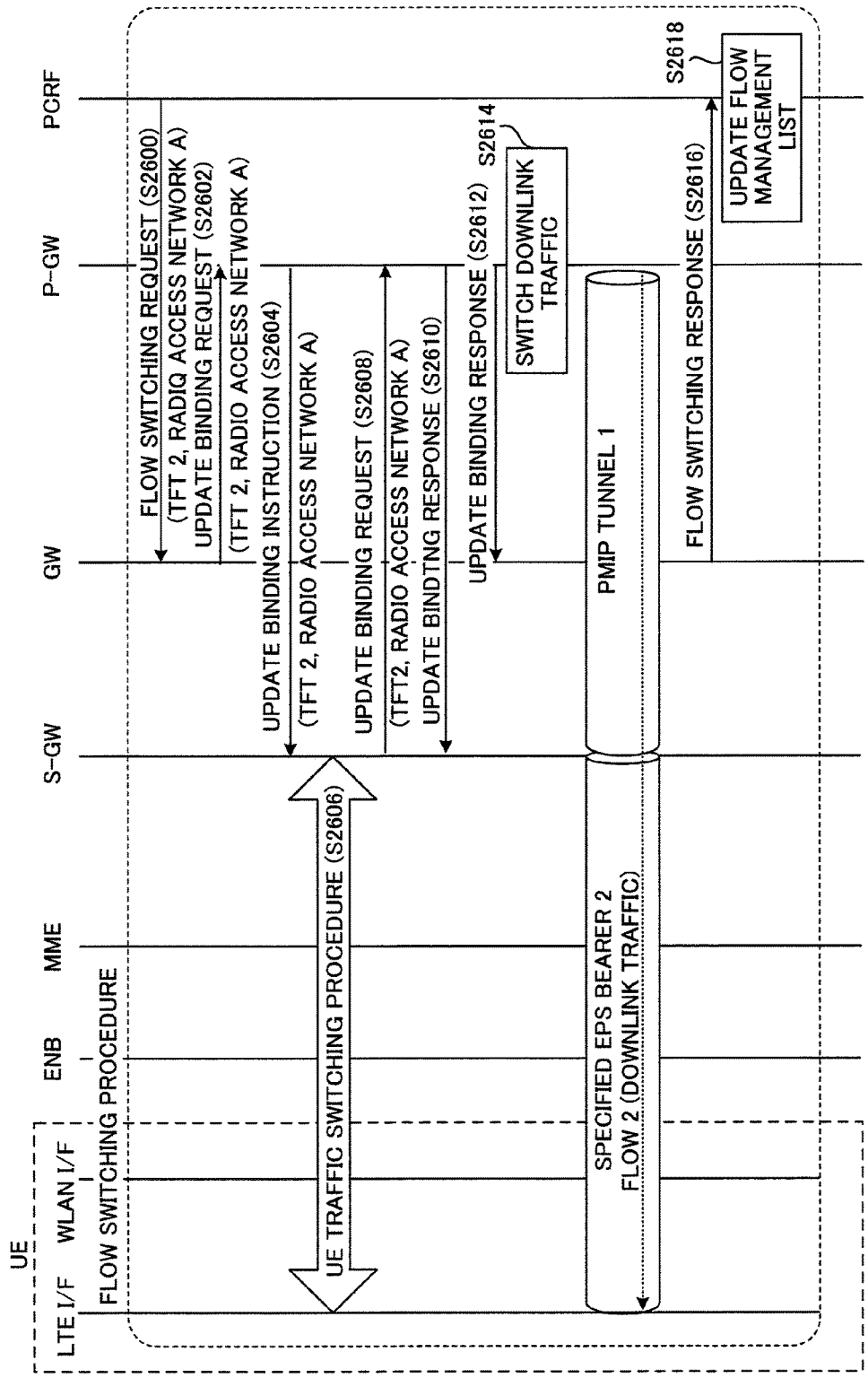
FIG. 23 is a diagram showing a second processing example of the second flow switching procedure from the radio access network B to the radio access network A in the first embodiment.

FIG. 23 shows a second processing example of the second flow switching procedure. The present processing example is different from the first processing example in that the uplink traffic switching procedure is performed during the downlink traffic switching procedure.

First, the PCRF 60 transmits a flow switching request to the GW 50 (S2600). The flow switching request includes a TFT 2 indicating the flow 2 and an access system type of a switching destination (here, assumed to be the radio access network A).

The GW 50 receives a flow switching request and transmits to the P-GW 20 an update binding request including the TFT 2 and the above-described access system type in order to update the binding information 232 in the P-GW 20 (S2602).

The P-GW 20, based on the received update binding request, recognizes that the switching destination of the flow 2 is the radio access network A, and transmits an update binding instruction to the S-GW 30 (S2604). The update binding instruction includes the TFT 2 and the radio access network A as an access system type.

The S-GW 30 receives the update binding instruction and performs the aforementioned second uplink traffic switching procedure so that the flow 2 is transmitted via the radio access network A (S2606). Then, the update binding request is transmitted to the P-GW 20 (S2608). Here, the update binding request includes the TFT 2 and the radio access network A as an access system type.

The P-GW 20, based on the received update binding request, updates the flow allocation list 234 as shown in FIG. 9(b), and transmits an update binding response to the S-GW 30 and the GW 50 (S2610, S2612). Thereafter, a flow corresponding to the TFT 2, when received from the PDN by the P-GW 20, is transferred to the S-GW 30 via the PMIP tunnel 1 and changed so as to be transmitted to the UE 10 via the radio access network A (S2614). Then, the GW 50 transmits a flow switching response to the PCRF 60 (S2616), and the PCRF 60 updates the flow management list 632 as shown in FIG. 10(c) (S2618).

As described above, the second flow switching procedure is completed and the flow 2, in both the uplink traffic and the downlink traffic, is thereby transmitted via the radio access network A.

In this way, in the present embodiment, as to a flow established via a specified radio access network according to a policy set in the UE, it is possible to switch a transmission path of a specified flow, initiated by a network. In the present embodiment, description has been given taking as an example a flow established by the UE 10, however, it is possible to switch a transmission path of a specified flow by repeating a same procedure also for the other mobile station. Accordingly, when congestion is generated or radio resources run short in one of radio access networks, it is possible to switch the transmission path of the specified flow to the other radio access network, initiated by a network, thus enabling dynamic and efficient allocation of network resources (for example, released radio resources are allocated on a priority basis to the other UE which is connectable only to the radio access network).

As a result, it becomes possible to perform flow distribution between a plurality of radio access networks in the entire mobile communication system while keeping a quality of service desired by a user, and it becomes possible to accommodate more traffic. Further, since this flow switching procedure is able to be realized only by a control message via the radio access network A and does not require any alteration to the radio access network B, even when the UE 10 is proposed with a connection function to a new radio access network, the procedure which is realized in the present embodiment is able to be used as it is.

Meanwhile, the present embodiment illustrates that there is an apparatus to initiate a flow switching procedure in the PCRF 60, but not limited thereto, this control apparatus may be an apparatus which is separate from the PCRF 60, or may be mounted in the P-GW 20.

2. Second Embodiment

Next, description will be given for a second embodiment of the present invention. Since a network configuration and an apparatus configuration of the present embodiment are the same as those of the first embodiment, detailed description thereof will be omitted.

Figure 24:
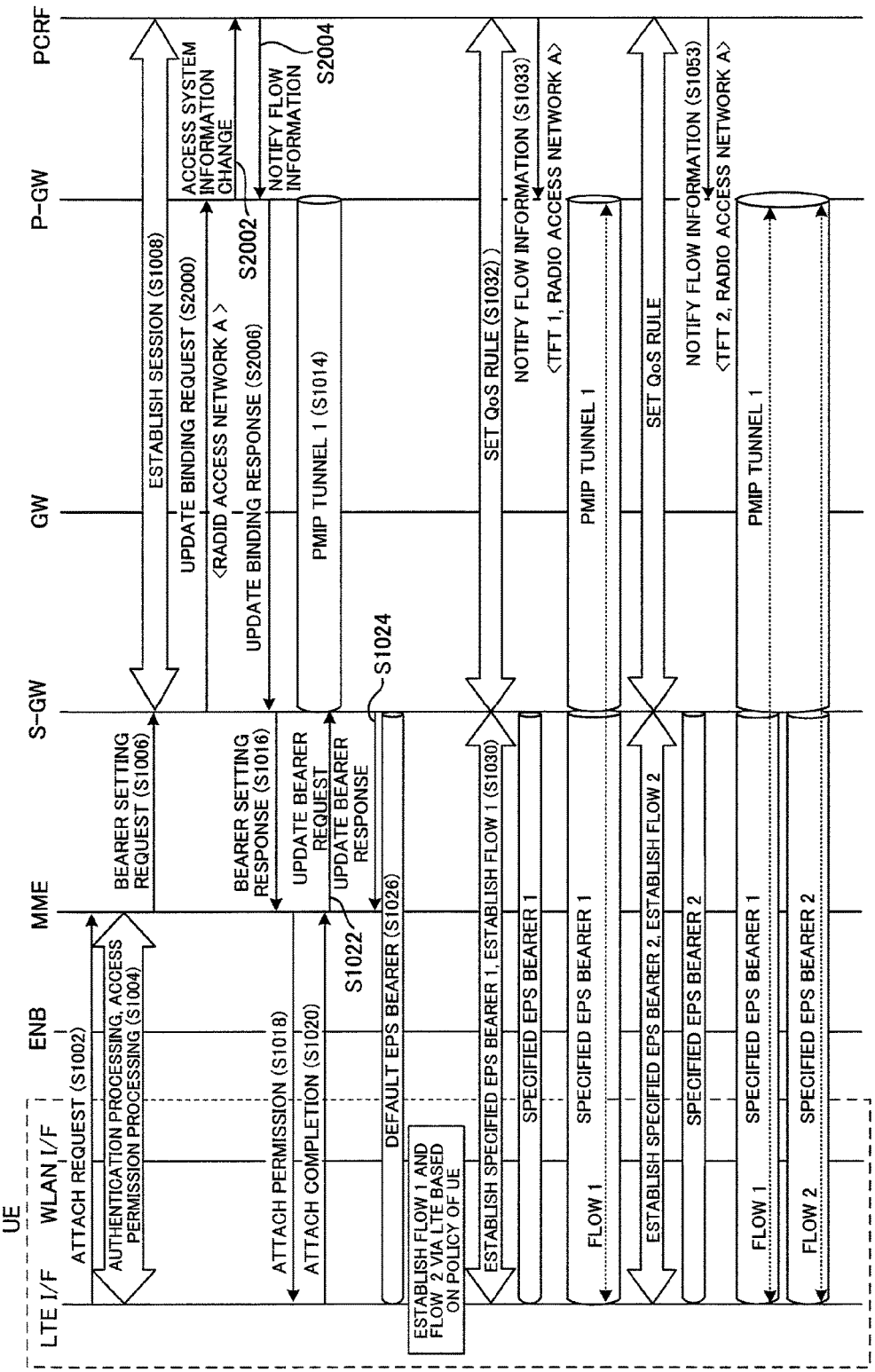
FIG. 24 is a diagram showing an example of an EPS attach sequence of the UE in a second embodiment.

Next, description will be given for a procedure in which the UE 10 is connected to the core network via the radio access network A and the radio access network B, respectively, in a network as shown in FIG. 1, with use of FIG. 24.

[2.1 Flow of Processing]

[2.1.1 UE Attach Processing Via Radio Access Network A]

First, similarly to the first embodiment, the UE 10 is connected to the core network via the radio access network A. Here, for processing which is the same as FIG. 11 in the first embodiment, same reference numerals are given and the description thereof will be omitted, and description will be given mainly for processing which is different from that in the first embodiment. Differently from the first embodiment, when the S-GW 30 transmits the update binding request to the P-GW 20 (S2000), a TFT 0 is not included, and only an MN_NAI (Mobile Node Network Access Identifier; an identifier of the UE 10) generated from IMSI and the access system type are included.

The P-GW 20 receives the update binding request and allocates a HoA to the UE 10. Further, the P-GW 20 notifies the PCRF 60 of the access system type (S2002) (access system information change), and notifies the PCRF 60 that the UE 10 is connected to the radio access system A.

The PCRF 60 refers to the flow management list 632 shown in FIG. 10(*a*), and transmits to the P-GW 20 flow information notification including the TFT 0 and an access system type corresponding thereto (radio access network A) (S2004).

The P-GW 20 then creates the flow allocation list 234 as shown in FIG. 9(*a*) based on the flow information notification, and thereafter returns the update binding response to the S-GW 30 (S2006). The HoA is included in a message. Thus, the PMIP tunnel 1 is established with between the S-GW 30 and the binding information 232 is created as shown in FIG. 8(*a*).

In an attach procedure thereafter, similarly to the first embodiment, a default EPS bearer is established and attach processing via the radio access network A is completed.

[2.1.2 Flow Establishment Processing Via the Radio Access Network A]

Subsequently, in accordance with a request of an application operating on the UE 10, the UE 10 establishes two flows (hereinafter referred to as a flow 1 and a flow 2, respectively) toward the PDN. Here, a point different from the first embodiment is a point that an update procedure of the flow allocation list of the P-GW 20 is processed by flow information notification from the PCRF 60.

Specifically, it is not that the S-GW 30 transmits to the P-GW 20 the update binding request including a TFT for each flow establishment, but that the PCRF 60 transmits to the P-GW 20 flow information notification including the TFT and the access system type, and the P-GW 20 changes the flow allocation list 234 as shown in FIG. 9(*b*).

[2.1.3 UE Attach Processing Via Radio Access Network B]

Subsequently, the UE 10 moves as well as detecting the radio access network B using the WLAN interface 120, and while maintaining connection with the radio access network A, starts connection processing to the core network as shown in FIG. 12 or FIG. 13 via the radio access network B. Since this procedure is the same as that in the first embodiment, the description thereof will be omitted.

[2.1.4 Switching Processing of Flow 2 to Radio Access Network B]

Figure 25:
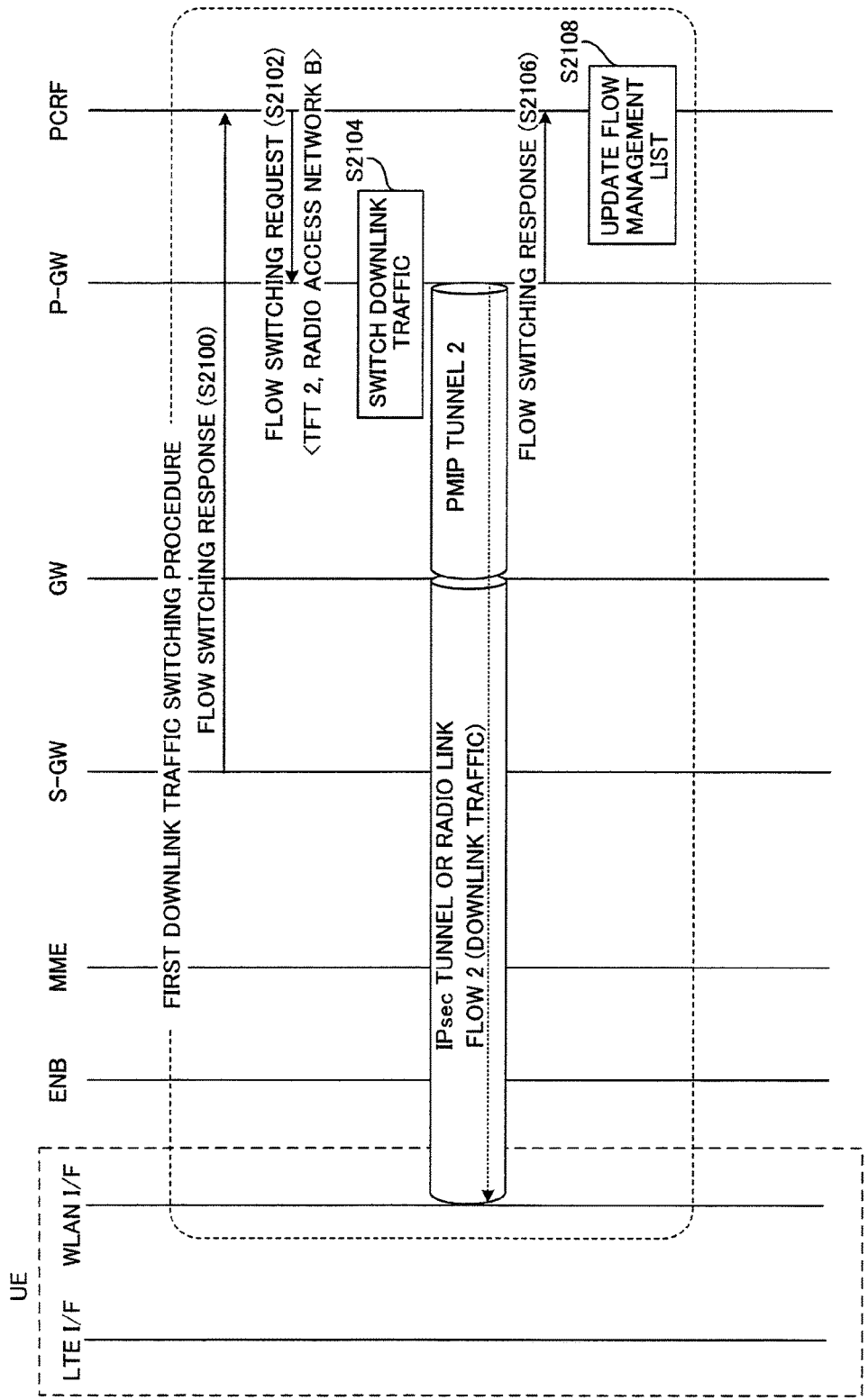
FIG. 25 is a diagram showing a first downlink traffic switching procedure from the radio access network A to the radio access network B in the second embodiment.

Here, assuming that a number of other UEs are connected to the core network via the radio access network A, and as a result, the radio access network A has become a congestion state, taking as an example a case of switching the flow 2 to the radio access network B similarly to the first embodiment, description will be given for a first downlink traffic switching procedure with use of FIG. 14 and FIG. 25.

As shown in FIG. 14, similarly to the first embodiment, first, switching of a transmission path of the uplink traffic of the flow 2 is performed, initiated by the PCRF 60. Next, the first downlink traffic switching procedure is performed, which is different from the first embodiment, description will be given below with use of FIG. 25.

First, the S-GW 30 transmits a flow switching response to the PCRF 60 (S2100), and notifies that switching of the uplink traffic is completed. Having received the flow switching response, the PCRF 60 subsequently transmits a flow switching request to the P-GW 20 (S2102). The flow switching request includes a TFT 2 and an access system type of a switching destination.

The P-GW 20 receives the flow switching request, and without transmitting an update binding instruction to the GW 50, directly updates the flow allocation list 234 as shown in FIG. 9(*c*), and thereafter a flow corresponding to the TFT 2, when received from the PDN, is transferred to the GW 50 via the PMIP 2 tunnel and changed so as to be transmitted to the UE 10 via the radio access network B (S2104). Then, the flow switching response is transmitted to the PCRF 60 (S2106), and completion of switching of the flow 2 is notified, and the PCRF 60 updates the flow management list 632 as shown in FIG. 10(*d*) (S2108). As mentioned above, the downlink traffic switching procedure is completed. Meanwhile, in the present example, description is given for a case where the downlink traffic switching procedure is started after the uplink traffic switching procedure is completed, however, differently therefrom, first, the PCRF 60 transmits the flow switching request to the P-GW 20 (S2102), the downlink traffic switching procedure is performed, and thereafter the uplink traffic switching procedure may be performed by starting S1202.

[2.1.5 Switching Processing of Flow 2 to Radio Access Network A]

Figure 26:
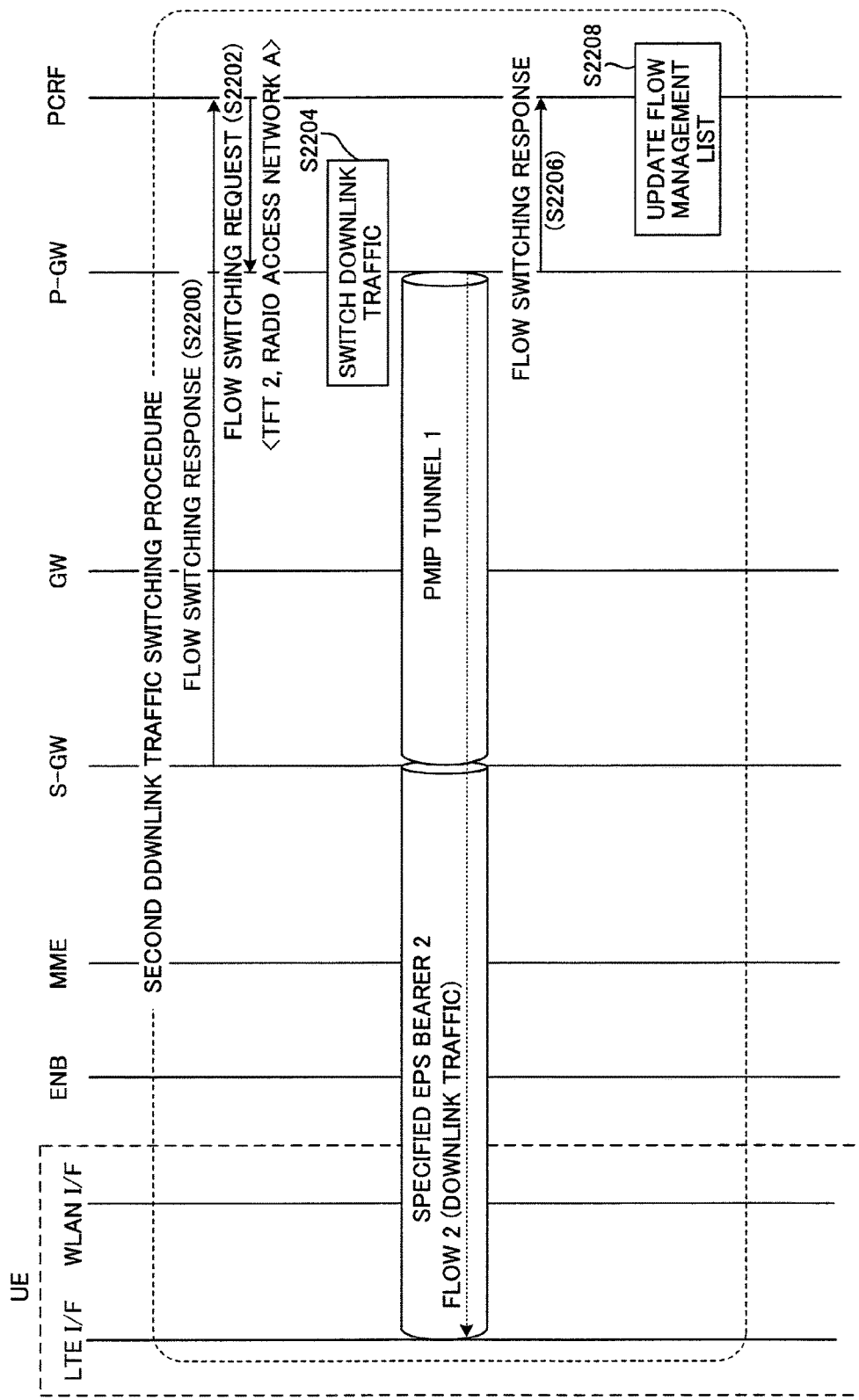
FIG. 26 is a diagram showing a second downlink traffic switching procedure from the radio access network B to the radio access network A in the second embodiment.

Further, description will be given for a procedure of switching a flow from the radio access network B to the radio access network A, initiated by a network when congestion is generated on the radio access network B thereafter, and with use of FIG. 19 and FIG. 26, for the second downlink traffic switching procedure.

As shown in FIG. 19, similarly to the first embodiment, first, switching of a transmission path of the uplink traffic of the flow 2 is performed by the PCRF 60 taking initiative. Next, the second downlink traffic switching procedure is performed, which is different from the first embodiment, description will be given below with use of FIG. 26.

First, the S-GW 30 transmits a flow switching response to the PCRF 60, and notifies that switching of the uplink traffic is completed (S2200).

Then, the PCRF 60 transmits a flow switching request to the P-GW 20 (S2202). The flow switching request includes a TFT 2 and an access system type of a switching destination.

The P-GW 20 receives the flow switching request, and without transmitting an update binding instruction to the S-GW 30, directly updates the flow allocation list 234 as shown in FIG. 9(*b*), and thereafter a flow corresponding to the TFT2, when received from the PDN, is transferred to the S-GW 30 via the PMIP tunnel 1 and changed so as to be transmitted to the UE 10 via the radio access network A (S2204). Then, the flow switching response is transmitted to the PCRF 60, and completion of switching of the flow 2 is notified (S2206). The PCRF 60 then updates the flow management list 632 as shown in FIG. 10(*c*) (S2208).

As described above, the downlink traffic switching procedure is completed. The flow 2, in both the uplink traffic and the downlink traffic, is thereby transmitted via the radio access network A. Meanwhile, in the present example, description is given for a case where a downlink traffic switching procedure is started after the uplink traffic switching procedure is completed, however, differently therefrom, first, the PCRF 60 transmits the flow switching request to the P-GW 20 (S2202), the downlink traffic switching procedure is performed, and thereafter the uplink traffic switching procedure which is started at S1602 may be performed.

In this way, a point that the present embodiment is different from the previous first embodiment is a point that updating of the flow allocation list 234 of the P-GW 20 is completed only by the instruction from the PCRF 60. Thereby it is not necessary to perform transmission/reception of the update binding request and the update binding response between the P-GW 20 and the S-GW 30 (or between the P-GW 20 and the GW 50) for each flow establishment or switching of a transmission path, thus making it possible to simplify processing.

As described above, the embodiments of the present invention have been described in detail with reference to the drawings, but a specific configuration is not limited to the embodiments and design or the like not departing from the spirit of the invention is also included in the scope of claims.

DESCRIPTION OF REFERENCE NUMERALS

1 mobile communication system
  10 UE
    100 control portion
    110 LTE interface
    120 WLAN interface
    130 storage portion
      132 policy information
    140 bearer establishment processing portion
    150 packet transmission/reception portion
  20 P-GW
    200 control portion
    210 transmission/reception portion
    230 storage portion
      232 binding information
      234 flow allocation list
    250 packet transmission/reception portion
    260 PMIP processing portion
  30 S-GW
    300 control portion
    310 transmission/reception portion
    330 storage portion
    340 bearer establishment processing portion
    350 packet transmission/reception portion
    360 PMIP processing portion
  40 MME
  50 GW
    500 control portion
    510 transmission/reception portion
    530 storage portion
    550 packet transmission/reception portion
    560 PMIP processing portion
  60 PCRF
    600 control portion
    610 transmission/reception portion
    630 storage portion
      632 flow management list
    670 congestion state detecting portion
  70 eNB

The invention claimed is:

1. A mobile station apparatus comprising:
a control portion; and
a transmission/reception portion, wherein
the control portion is configured to:
  establish a first communication path connecting with a core network via a first access network based on an Access Point Name (APN), and
  establish a second communication path connecting with the core network via a second access network based on the APN, and
the transmission/reception portion is configured to:
transmit or receive a first flow and a second flow by using the first communication path,
receive, from the core network, a control message containing at least an identification information of the first flow,
send, to the core network, a response control message for the control message,
after transmission of the response control message, transmit or receive the first flow by switching to use of the second communication path based on the control message, and
maintain transmission or reception of the second flow by using the first communication path,
wherein the control message is the message received in a procedure initiated by the core network, the procedure being to change the communication path for the first flow.

2. The mobile station apparatus according to claim 1, further comprising:
a storage portion configured to store a mobile station policy for determining a communication path to be used for communications of a flow, wherein
the transmission/reception portion is configured to transmit and receive the first flow and the second flow using the first communication path, based on the mobile station policy until sending the response control message.

3. The mobile station apparatus according to claim 1, wherein the identification information of the first flow contained in the control message is determined based on an operator policy for determining a communication path which is used for communications of a flow by a mobile system provider.

4. The mobile station apparatus according to claim 1, wherein the control portion is configured to perform the establishment of the first communication path to a gateway in the core network and connect the core network with a Packet Data Network (PDN), and the gateway is selected based on the APN.

5. A gateway apparatus being configured in a core network and connecting a Packet Data Network (PDN) with the core network, the gateway apparatus comprising:

a transmission/reception portion configured to:

transmit/receive a first flow and a second flow by using a first communication path connecting a mobile station apparatus and a core network via a first access network, the first communication path being established based on an Access Point Name (APN), transmit, toward the mobile station via a second gateway, a control message containing at least an identification information of the first flow in order to switch communications of the first flow to use a second communication path connecting the mobile station apparatus and the core network via a second access network, the second communication path being established based on the APN, the second gateway being connecting the core network and the second access network, receive, from the mobile station, a response control message for the control message, and after reception of the response control message, transmit or receive the first flow by switching to use of the second communication path based on the control message, wherein the control message is the message transmitted in a procedure initiated by the core network, the procedure being to change the communication path for the first flow.

6. The gateway apparatus according to claim 5, wherein the identification information of the first flow contained in the control message is determined based on an operator policy for determining a communication path which is used for communications of a flow by a mobile communication system provider.

7. The gateway apparatus according to claim 5, wherein the transmission/reception portion is configured to perform the transmission of the control message via a first gateway connecting a base station configured in the first access network with the core network.

8. The gateway apparatus according to claim 5, wherein the transmission/reception portion is configured to perform the transmission of the control message via the second gateway connecting a base station configured in the second access network with the core network.

9. The gateway apparatus according to claim 5, wherein the identification information of the first flow is transmitted from a Policy and Charging Rules Function (PCRF).

10. A communication method in a mobile station apparatus, the communication method comprising:

establishing a first communication path connecting with a core network via a first access network, based on an Access Point Name (APN), establishing a second communication path connecting with the core network via a second access network, based on the APN, transmitting or receiving a first flow and a second flow by using the first communication path, receiving, from the core network, a control message containing at least an identification information of the first flow, sending, to the core network, a response control message for the control message, after transmission of the response control message, transmitting or receiving the first flow by switching to use the second communication path based on the control message, and maintaining transmission or reception of the second flow by using the first communication path, wherein the control message is the message received in a procedure initiated by the core network, the procedure being to change the communication path for the first flow.

* * * * *